US006477677B1

(12) United States Patent
Abiven et al.

(10) Patent No.: US 6,477,677 B1
(45) Date of Patent: *Nov. 5, 2002

(54) DEVICE AND METHOD FOR CODING AND DECODING DATA

(75) Inventors: Anne Abiven, Rennes (FR); Alain Caillerie, Rennes (FR)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,512

(22) Filed: Apr. 23, 1998

(30) Foreign Application Priority Data

Apr. 28, 1997 (FR) ............................................ 97 05211
May 26, 1997 (FR) ............................................ 97 06379

(51) Int. Cl.$^7$ ............................................ H03M 13/05
(52) U.S. Cl. ...................................... 714/752; 714/763
(58) Field of Search ................................ 714/752, 763

(56) References Cited

U.S. PATENT DOCUMENTS

| | | | |
|---|---|---|---|
| 3,863,226 A | 1/1975 | Ryburn | ................... 340/172.5 |
| 4,590,467 A | 5/1986 | Lare | ...................... 340/825.5 |
| 4,633,471 A | 12/1986 | Perera et al. | ............. 371/38 |
| 5,109,385 A | * 4/1992 | Karp et al. | ................. 360/48 |
| 5,157,670 A | * 10/1992 | Kowal | .................... 371/40.1 |

OTHER PUBLICATIONS

Logan et al., "An IEEE 802 CSMA/CD Controller For The 68000 And General Purpose Applications", Mini–Micro Conf. Rec., 11/83, pp. 1–9.
Pat. Abs. Jp., vol. 016, No. 031 (E–1159), Oct. 31, 1991 (JP 03 244219A).
Pat. Abs. Jp., vol. 009, No. 095 (E–310) Dec. 12, 1984 (JP 59 221028A).
Pat. Abs. Jp., vol. 097, No. 003, Nov. 22, 1996 (JP 08 307396A).
Pat. Abs. Jp., vol. 097, No. 002, Oct. 22, 1996 (JP 08 279756A).

* cited by examiner

Primary Examiner—Stephen M. Baker
(74) Attorney, Agent, or Firm—Fitzpatrick, Cella, Harper & Scinto

(57) ABSTRACT

For coding and decoding data, the data to be coded and the decoded data being stored in a memory (1), a single data coding and decoding means (4) is used. The coding and decoding means is initialised in coding mode, and the passage of data to be coded from the memory (1) to the coding and decoding means (4) is controlled, or the coding and decoding means is initialised in decoding mode, and the input of coded data into the coding and decoding means (4) and the passage of decoded data from the coding and decoding means to the memory (1) are controlled.

28 Claims, 16 Drawing Sheets

Figure 9:
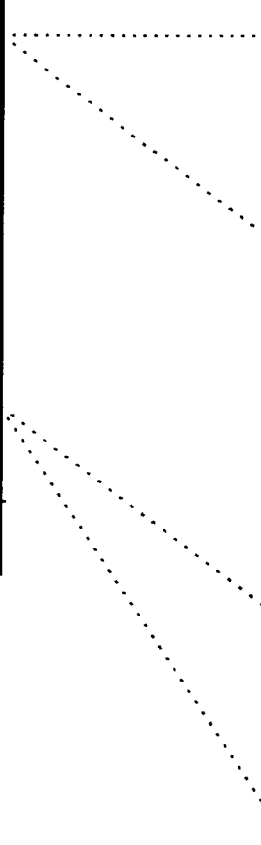

FIG. 9a  FIG. 9b  FIG. 9c

DEVICE AND METHOD FOR CODING AND DECODING DATA

The present invention concerns in general terms the coding and decoding of digital data, and relates particularly to the use of a single circuit for coding and decoding data, for example in a device for sending and receiving data.

The invention also relates to the transfer of data between a memory and a data coding or decoding circuit.

In the majority of cases of transmission of data between a sending device and a receiving device, it is necessary to code the data before the sender transmits them, and correlatively to decode them after the receiver has received them. The purpose of the coding is for example to minimise transmission errors due to noise corrupting the transmitted data, or to encrypt the transmitted data.

The coding and decoding operations can be performed by a single circuit, which is programmed either in coding mode or in decoding mode. A data coding and decoding device then uses a coding circuit and a decoding circuit which are programmed once and for all.

However, in the case of applications functioning in half-duplex mode, it is clear that the coding circuit and the decoding circuit never operate simultaneously. Since these circuits are relative expensive, a device which has two of these circuits is expensive.

The type of coding envisaged here consists of increasing the total number of data to be transmitted, by adding coding data to the data initially to be transmitted, or useful data.

A coding circuit processes the useful data in blocks in order to code them, one block including for example a few tens of octets. The coding circuit requires as an input blocks of data to be coded separated from each other by padding blocks. The coding circuit replaces the padding blocks with blocks of coding data. The coding circuit produces successive frames each having a block of useful data formed by a certain number of words of useful data, and a block of coding data formed by a certain number of words of coding data.

On reception, the coding data must be separated from the useful data. The coding data are used for decoding the useful data, for example by correcting any transmission errors, or by decrypting the useful data. The latter can then be stored to memory, for example.

The decoding circuit therefore produces successive blocks of useful data.

In addition, more and more devices use a direct access circuit for transferring data between two internal circuits. A direct access circuit allows more rapid transfers than a processor and does not monopolise the processor.

In order to use a direct access circuit as effectively as possible, that is to say to effect rapid data transfers, it is necessary to effect a continuous transfer of a data "stream". However, as stated above, the coding circuit requires, as an input, blocks of data to be coded separated from each other by padding blocks.

There is therefore incompatibility between transferring the data in continuous streams and supplying useful data in blocks, with interruption between the blocks.

This is because the transmission of successive small blocks of data by means of a direct access circuit eliminates the advantage of the latter, since it would then be necessary to reprogram the direct access circuit for each block transmitted.

In order to transfer data between a memory and a coding circuit as envisaged here, it is therefore not realistic to effect successive transfers of blocks containing the number of words of useful data for each of the frames to be formed.

In order to effect a continuous transfer of a large number of words of useful data between the memory and the coding circuit, it can be envisaged including non-significant words after each block of useful data, prior to transfer. At the time of coding, these non-significant words will be replaced by the coding words. However, this results in storing the non-significant words with the useful data words, and consequently a large amount of memory space is necessary.

Likewise, after decoding, in order to effect a continuous transfer of a large number of data words to the memory, it can be envisaged transmitting the coding words with the useful data words. There again, this results in using a large amount of memory space, by the storage of coding words which then no longer have any function.

Both for coding and decoding, the memory is poorly used, since it contains non-signficant words or coding words, in addition to useful data.

Thus the transfer of data between a memory and a coding or decoding circuit by means of a direct access circuit results in using either the direct access circuit or the memory in a non-optimum fashion.

The present invention aims to remedy the drawbacks of the prior art by providing a device and a method for coding and decoding data which makes it possible to code and decode data in half-duplex mode in a more economical fashion, whilst being just as effective, than in the prior art.

For this purpose, the invention proposes a method of coding and decoding data, the data to be coded and the decoded data being stored in a memory, characterised in that the coding and decoding are performed by a single data coding and decoding means, and in that it includes the steps of:
  initialising the coding and decoding means in coding mode, and controlling the passage of data to be coded from the memory to the coding and decoding means, and
  initialising the coding and decoding means in decoding mode, and controlling the input of coded data into the coding and decoding means, and the passage of decoded data from the coding and decoding means to the memory.

Correlatively, the invention concerns a data coding and decoding device, having a memory for storing the data to be coded and the decoded data, characterised in that it has a single data coding and decoding means and a control means adapted to, selectively:
  initialise the coding and decoding means in coding mode, and control the passage of data to be coded from the memory to the coding and decoding means, and
  initialise the coding and decoding means in decoding mode, and control the input of coded data into the coding and decoding means, and the passage of decoded data from the coding and decoding means to the memory means.

The invention also concerns a data coding and decoding device, adapted to cooperate with a memory for storing the date to be coded and the decoded data, characterised in that it has a single data coding and decoding means and a control means adapted to, selectively:
  initialise the coding and decoding means in coding mode, and control the passage of data to be coded from the memory to the coding and decoding means, and
  initialise the coding and decoding means in decoding mode, and control the input of coded data into the coding and decoding means, and the passage of decoded data from the coding and decoding means to the memory means.

The method and device according to the invention allow a coding and a decoding of data in half-duplex mode which is performed economically since a single coding and decoding component is required.

According to a preferred characteristic of the invention, the method also includes the step of controlling a transfer of data to a data transmission means after the coding of the data. This is because the data coding applies particularly to the transmission of data, for example by radio transmission.

According to another preferred characteristic of the invention, the method includes the step of controlling a transfer of data between a data reception means connected at the input to the coding and decoding means, and the coding and decoding means. This is because the decoding of data applies particularly to the reception of data which have for example been sent by radio transmission.

The control means is advantageously connected at the input and output of the coding and decoding means, so that the data to be coded and the decoded data pass through the control means. Controlling the data transfer is thus performed reliably and economically.

According to other preferred characteristics, the device includes a data transmission means connected at the output of the coding and decoding means, and the control means is adapted to control the transfer of data between the coding and decoding means and the transmission means.

The device includes a data reception means, and the control means is adapted to control the transfer of data between the data reception means and the coding and decoding means. The device according to the invention is thus particularly used in a data sending and receiving context.

The present invention also concerns a data processing device, a communication device, such as computer, printer or facsimile apparatus, including the preceding coding and decoding device.

The present invention also concerns a storage medium, such as a floppy disk or a CD-ROM.

The advantages of these devices and storage medium are similar to those previously described.

The aim of the invention is also to make the use of a coding circuit or decoding circuit compatible with a direct access circuit, and to allow a rapid transfer of data between a memory and a coding or decoding circuit, whilst allowing optimum use of the memory.

To this end, the invention proposes a device for the coding of data extracted from a main memory, the data being in the form of useful data words, having:
  a means of direct access to the main memory in order to extract the data to be coded,
  a means of coding the extracted data, by the formation of groups of words each having a first predetermined number of useful data words and a second predetermined number of additional words, the additional words being determined by the coding means,
characterised in that it has:
  a first buffer memory means connected between the direct access means and the coding means, the said buffer memory means receiving the extracted data, and
  a means of controlling the transfer of data between the first buffer memory means and the coding means, adapted to control successively a transfer of the first predetermined number of useful data words and an interruption of the transfer of the data words for a period of interruption corresponding to the period which would be necessary for transferring the second predetermined number of additional words.

The invention also proposes a data coding device, adapted to cooperate with:
  a main memory containing the data to be coded, the data being in the form of useful data words,
  a means of direct access to the main memory for extracting the data to be coded,
and having:
  a means of coding the extracted data, by the formation of groups of words each having a first predetermined number of useful data words and a second predetermined number of additional words, the additional words being determined by the coding means,
characterised in that it has:
  a first buffer memory means connected between the direct access means and the coding means, the said buffer memory means receiving the extracted data, and
  a means of controlling the transfer of data between the first buffer memory means and the coding means, adapted to control successively a transfer of the first predetermined number of useful data words and an interruption of the transfer of the data words for a period of interruption corresponding to the period which would be necessary for transferring the second predetermined number of additional words.

Correlatively, the invention proposes a method of coding data extracted from a main memory, the data being in the form of useful data words, including the step of:
  coding the extracted data, by a coding means forming groups of words each including a first predetermined number of useful data words and a second predetermined number of additional words, the additional words being determined by the coding,
characterised in that it includes the steps of:
  storing the extracted data in a first buffer memory means, prior to coding, and
  controlling a transfer of the first predetermined number of useful data words between the first buffer memory means and the coding means, and successively an interruption of the transfer of the data words for a period of interruption corresponding the period which would be necessary for transferring the second predetermined number of additional words.

The coding device and method according to the invention allow a rapid transfer of data between the main memory and the coding circuit, by means of the direct access circuit, whilst storing only the useful data in the main memory.

Thus the main memory and the direct access circuit are both used in an optimum fashion, by virtue of the use of a buffer memory between the direct access means and the coding means, and by virtue of the appropriate control of the data transfers between the buffer memory and the coding means.

According to a preferred characteristic, the control means is adapted to control the transfer of data between the main memory and the first buffer memory means, via the direct access means.

The transfer of data between the main memory and the buffer memory is a rapid transfer of a large number of useful data, whilst the transfer of data between the buffer memory and the coding means is a transfer of successive blocks of data words each containing a smaller number of useful data words.

According to another preferred characterstic, a data transmission means is connected at the output from the coding means, and the control means is adapted to control the transfer of data between the coding means and the transmission means. In fact, the coding of data is applied particularly to the transmission of data, for example, by radio transmission.

The invention also concerns a device for the decoding of data coded in the form of groups of words each having a first predetermined number of useful data words and a second predetermined number of additional words, having:

a means of decoding the coded data, in order to supply the first predetermined number of useful data words in each of the groups of words, a main memory for storing the useful data words supplied by the decoding means, a means of direct access to the main memory in order to enter the useful data words therein, characterised in that it has:

a second buffer memory means connected between the decoding means and the direct access means, and a means of controlling the transfer of data between the decoding means and the second buffer memory means, adapted to control successively a transfer of the first predetermined number of useful data words and an interruption of the transfer of the data words for a period of interruption corresponding to the period which would be necessary for transferring the second predetermined number of additional words.

The invention also concerns a device for the decoding of data coded in the form of groups of words each having a first predetermined number of useful data words and a second predetermined number of additional words, having:

a means of decoding the coded data, in order to supply the first predetermined number of useful data words in each of the groups of words, and adapted to cooperate with:

a main memory for storing the useful data words supplied by the decoding means, a means of direct access to the main memory in order to enter the useful data words therein, characterised in that it has:

a second buffer memory means connected between the decoding means and the direct access means, and a means of controlling the transfer of data between the decoding means and the second buffer memory means, adapted to control successively a transfer of the first predetermined number of useful data words and an interruption of the transfer of the data words for a period of interruption corresponding to the period which would be necessary for transferring the second predetermined number of additional words.

Correlatively, the invention concerns a method of decoding data coded in the form of groups of words each having a first predetermined number of useful data words and a second predetermined number of additional words, including the steps of:

decoding the coded data, by a decoding means supplying the first predetermined number of useful data words in each of the groups of words, storing the useful data words supplied by the decoding means, characterised in that it includes the steps of:

storing the decoded data in a second buffer memory means, and controlling a transfer of the first predetermined number of useful data words between the decoding means and the second buffer memory means, and successively an interruption of the transfer of the data words during a period of interruption corresponding to the period which would be necessary for transferring the second predetermined number of additional words.

The advantages offered by the invention for transferring data between the decoding means and the main memory are similar to those set out above.

According to preferred characteristics:

the control means is adapted to control the transfer of data between the second buffer memory means and the main memory, via the direct access circuit, a data reception means is connected at the input of the decoding means, and the control means is adapted to control the transfer of data between the data reception means and the decoding means.

The present invention also concerns a data processing device, a communication device, such as computer, printer or facsimile apparatus, including the preceding device for the coding of data extracted from a main memory or the corresponding decoding device.

The present invention also concerns a storage medium, such as a floppy disk or a CD-ROM.

The advantages of these devices and storage medium are similar to those previously described.

Figure 1:
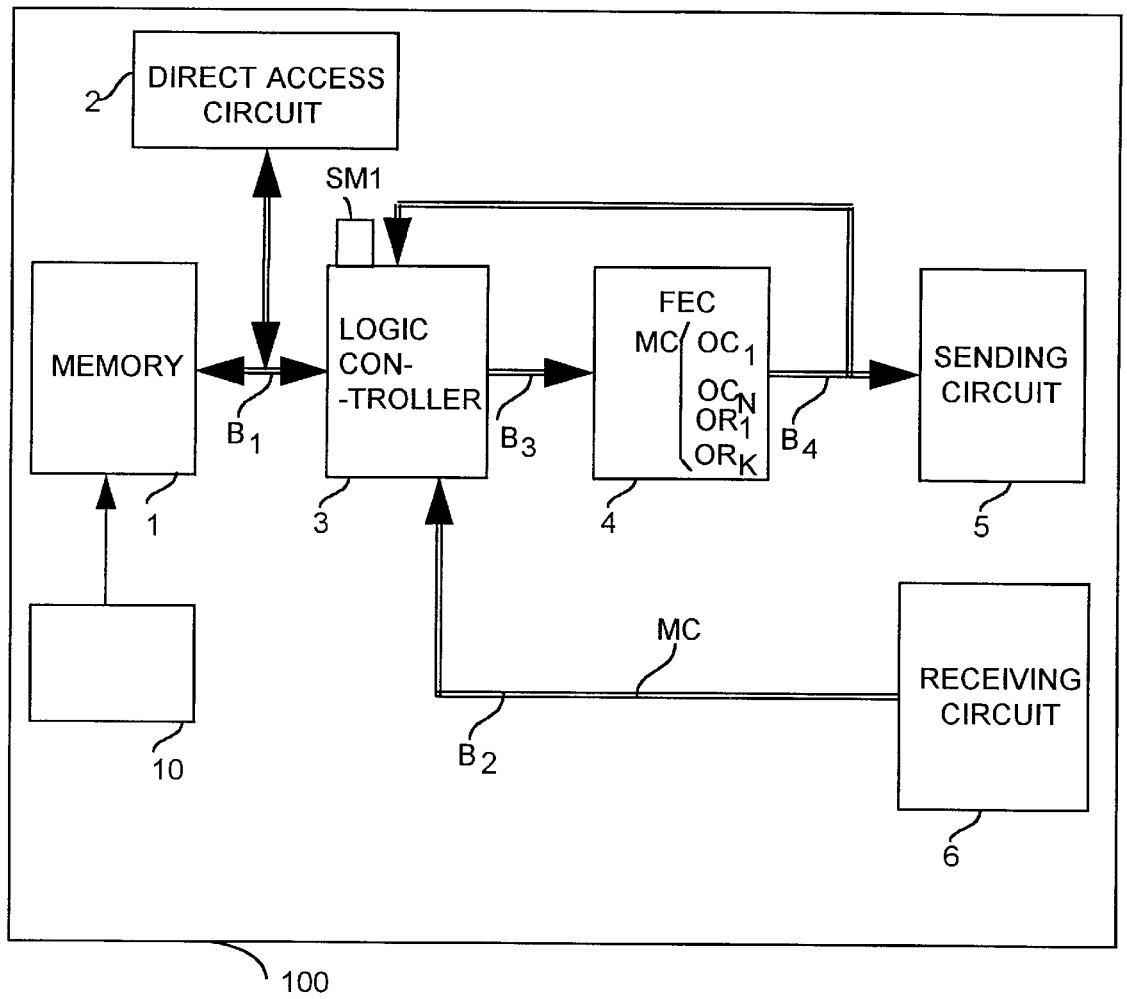
Figure 2:
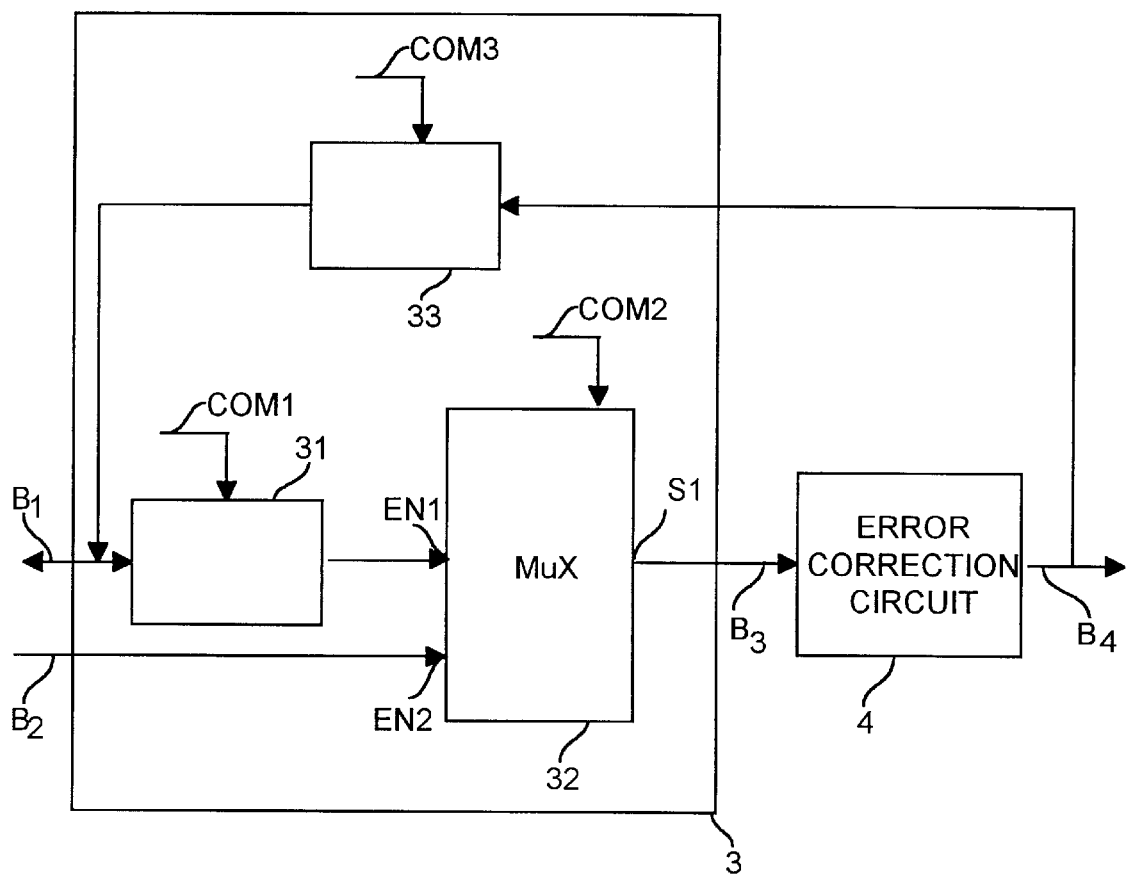
Figure 3:
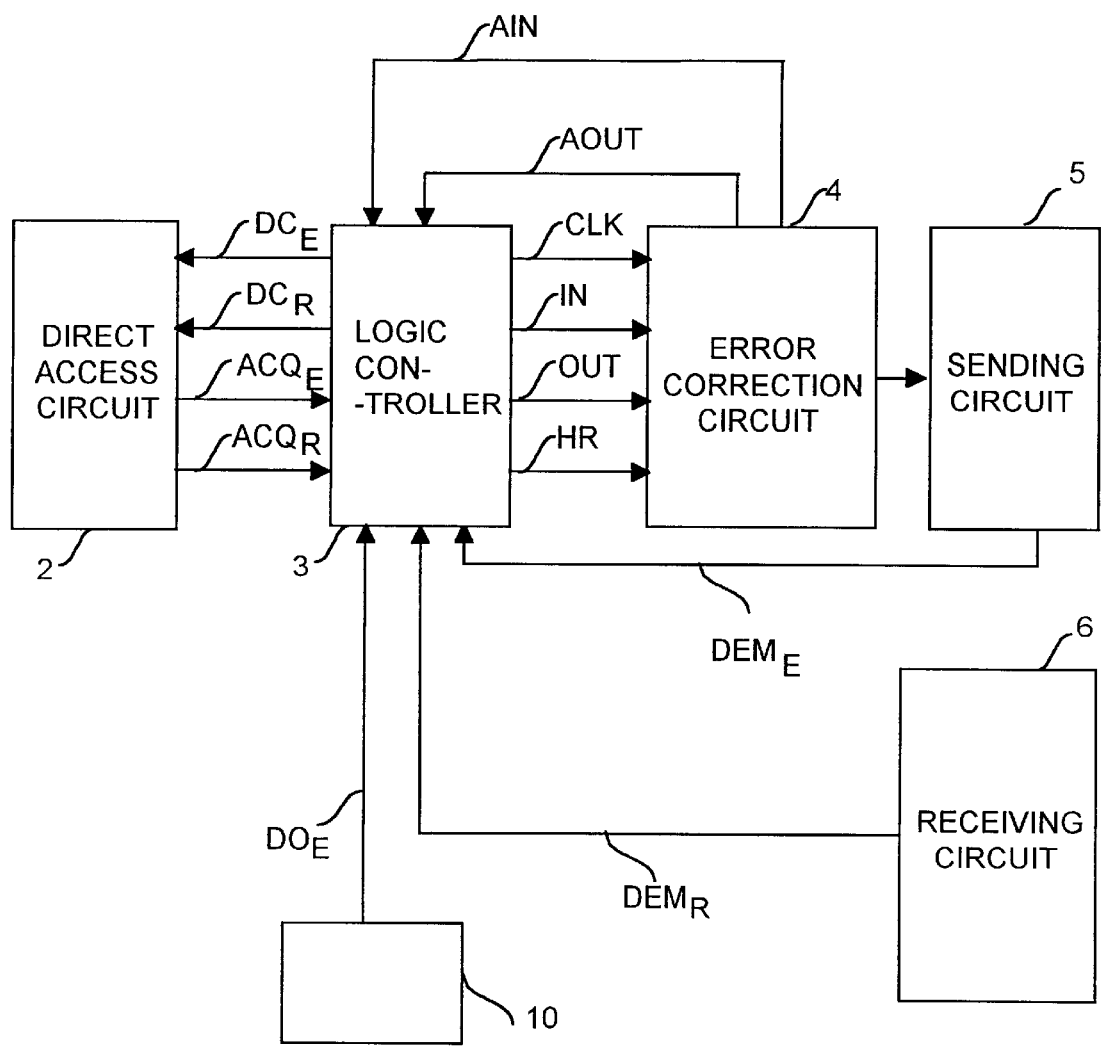
Figure 4:
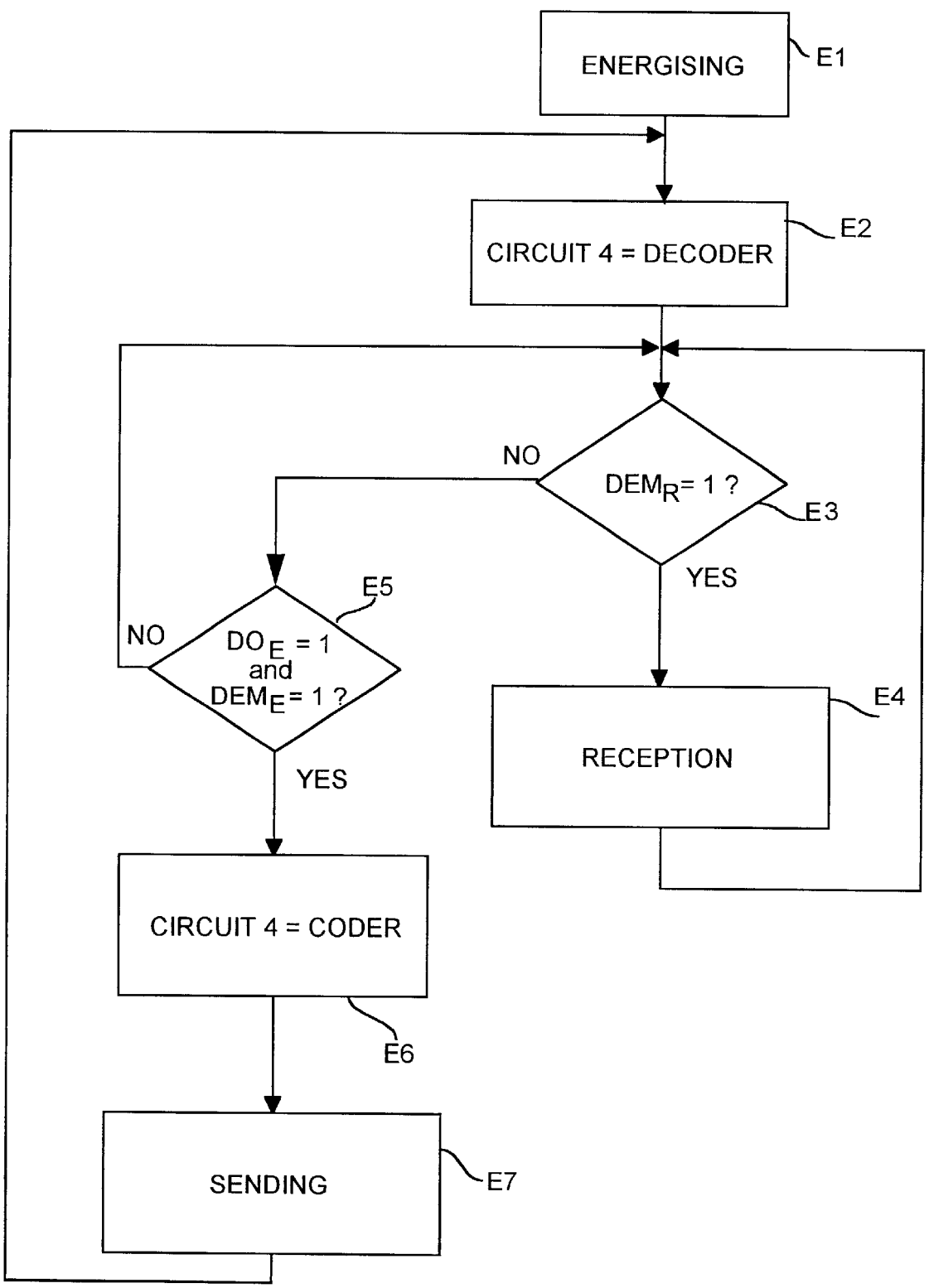
Figure 5:
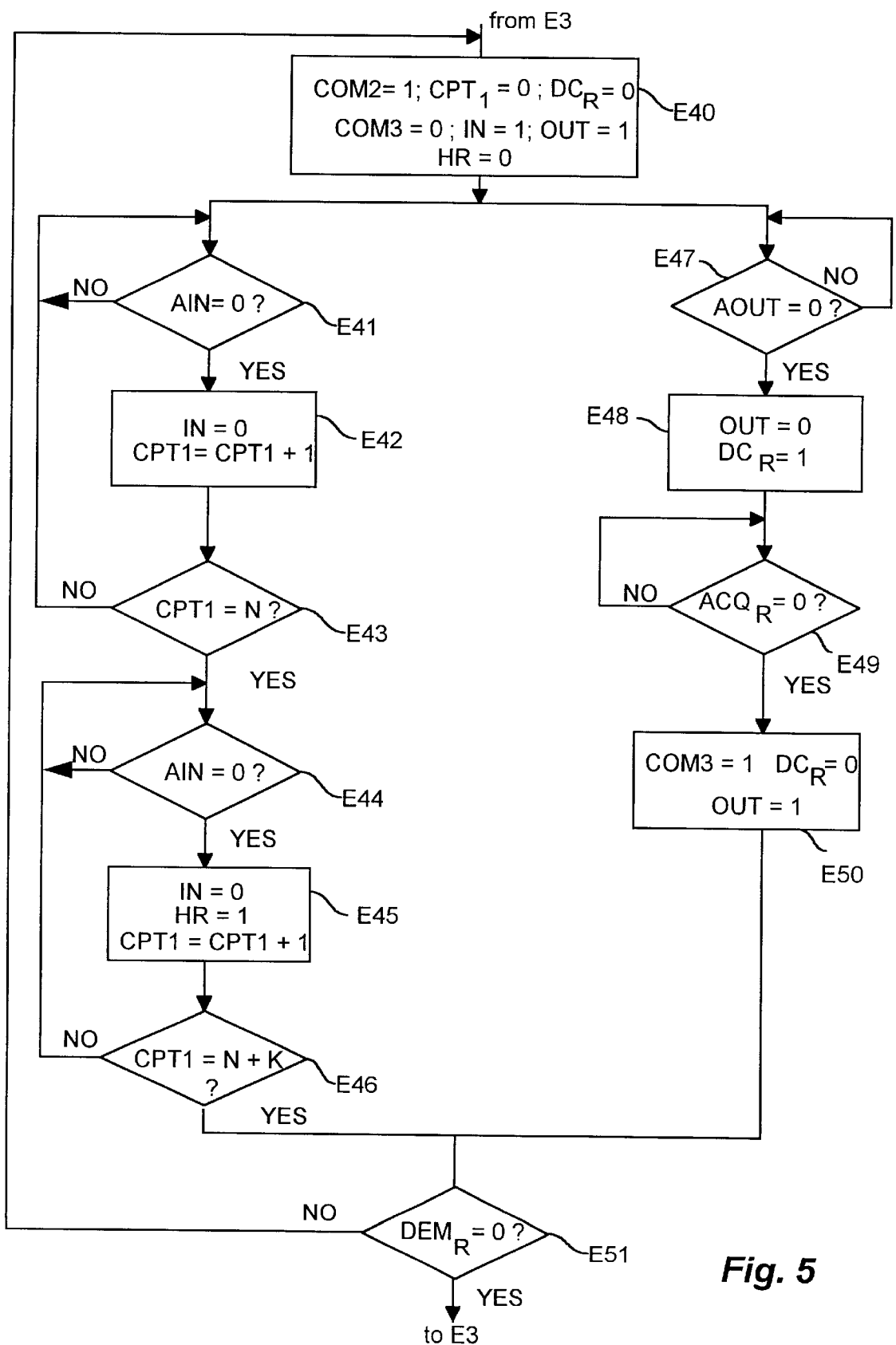
Figure 6:
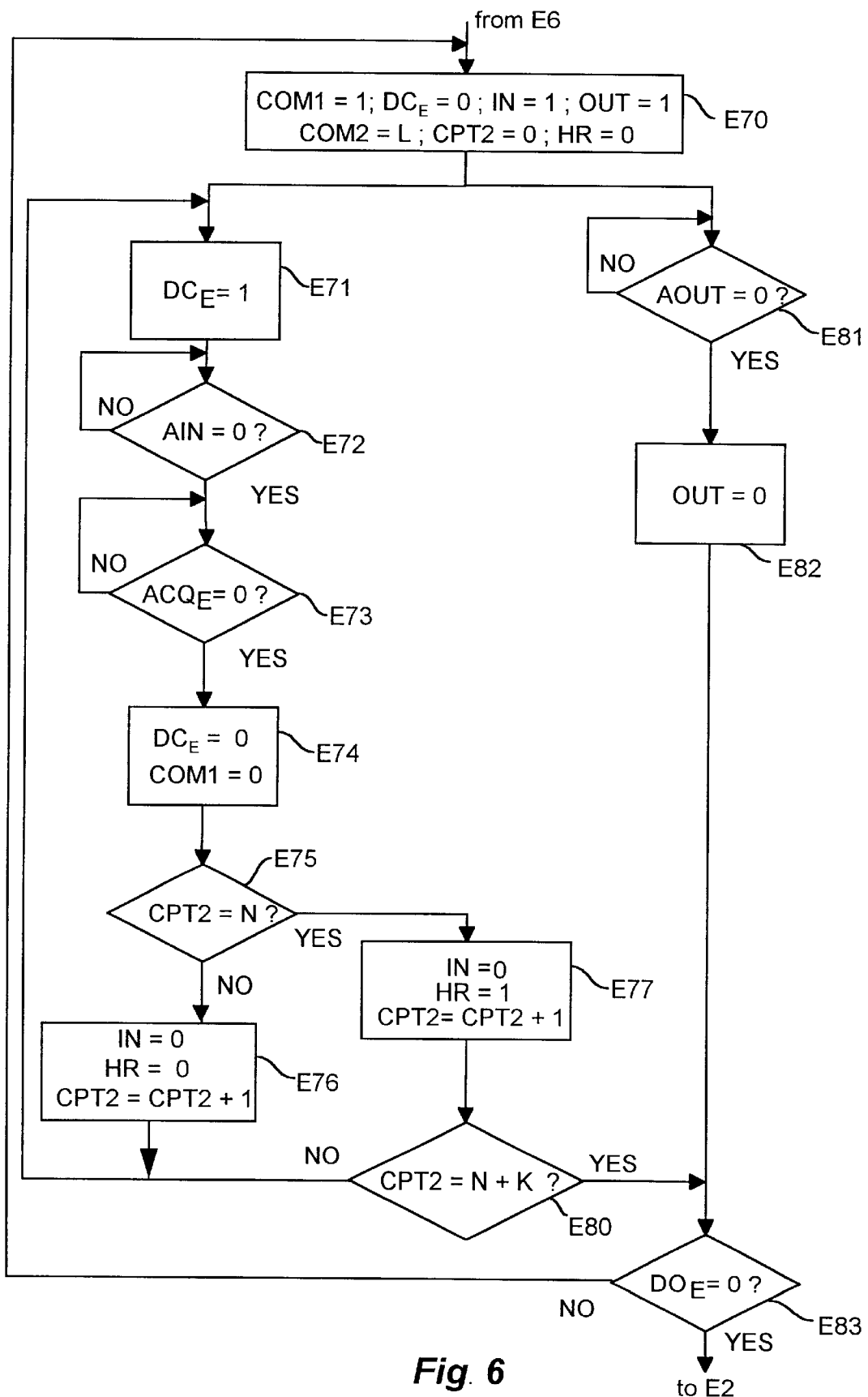
Figure 7:
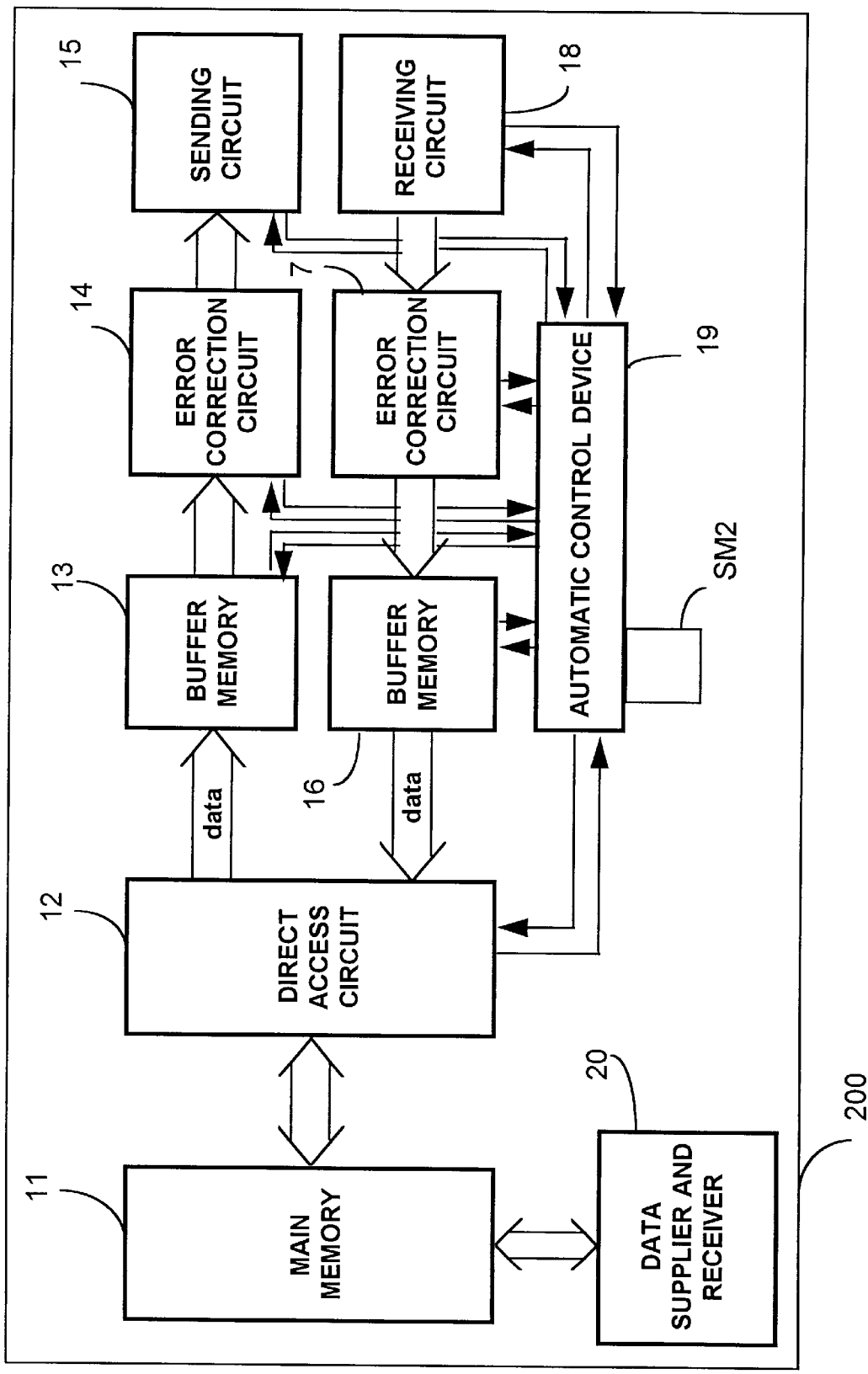
Figure 8:
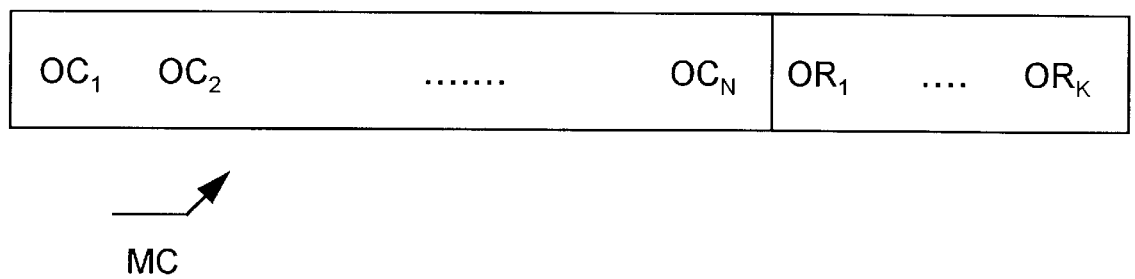
Figure 10:
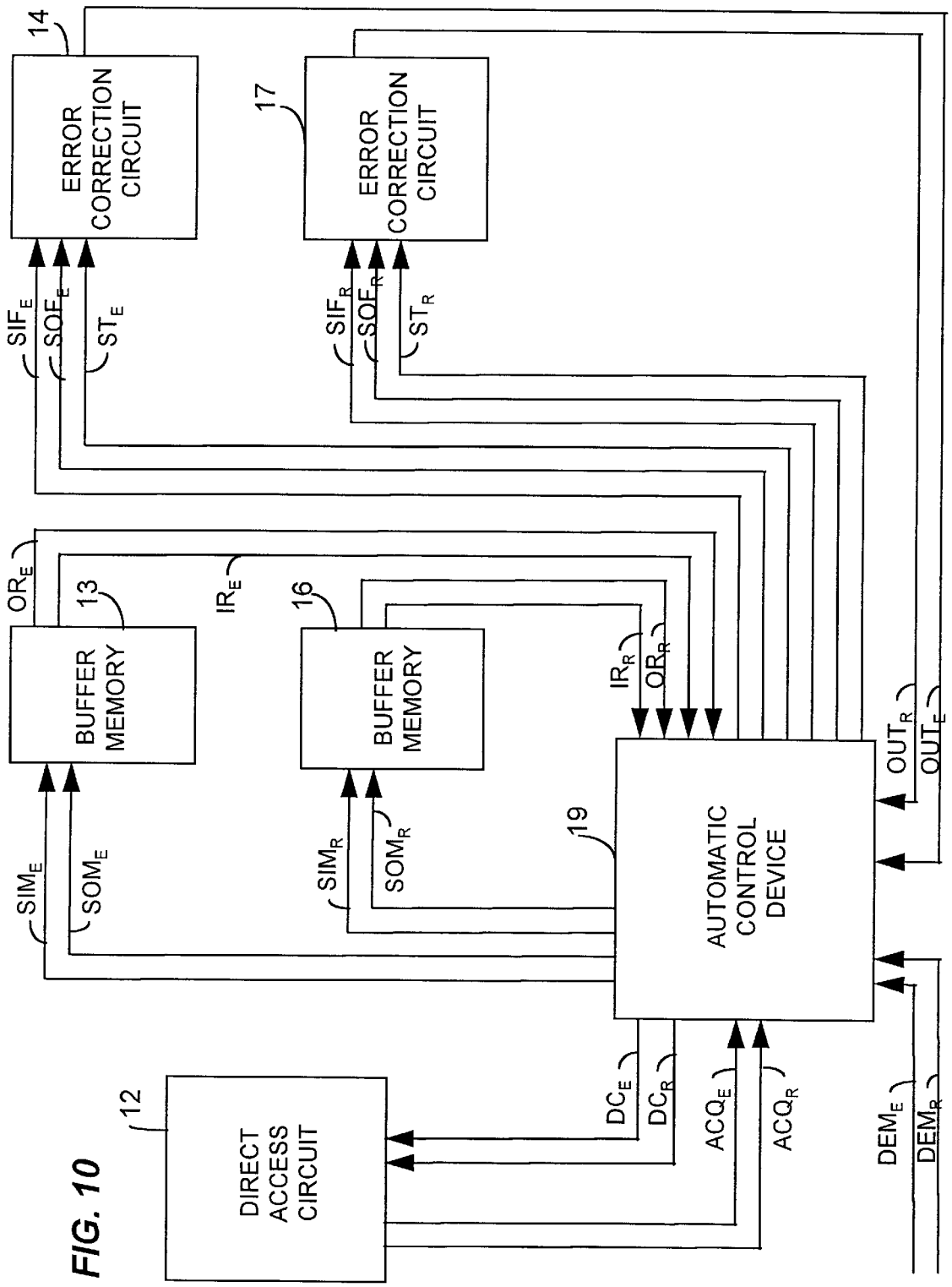
Figure 12:
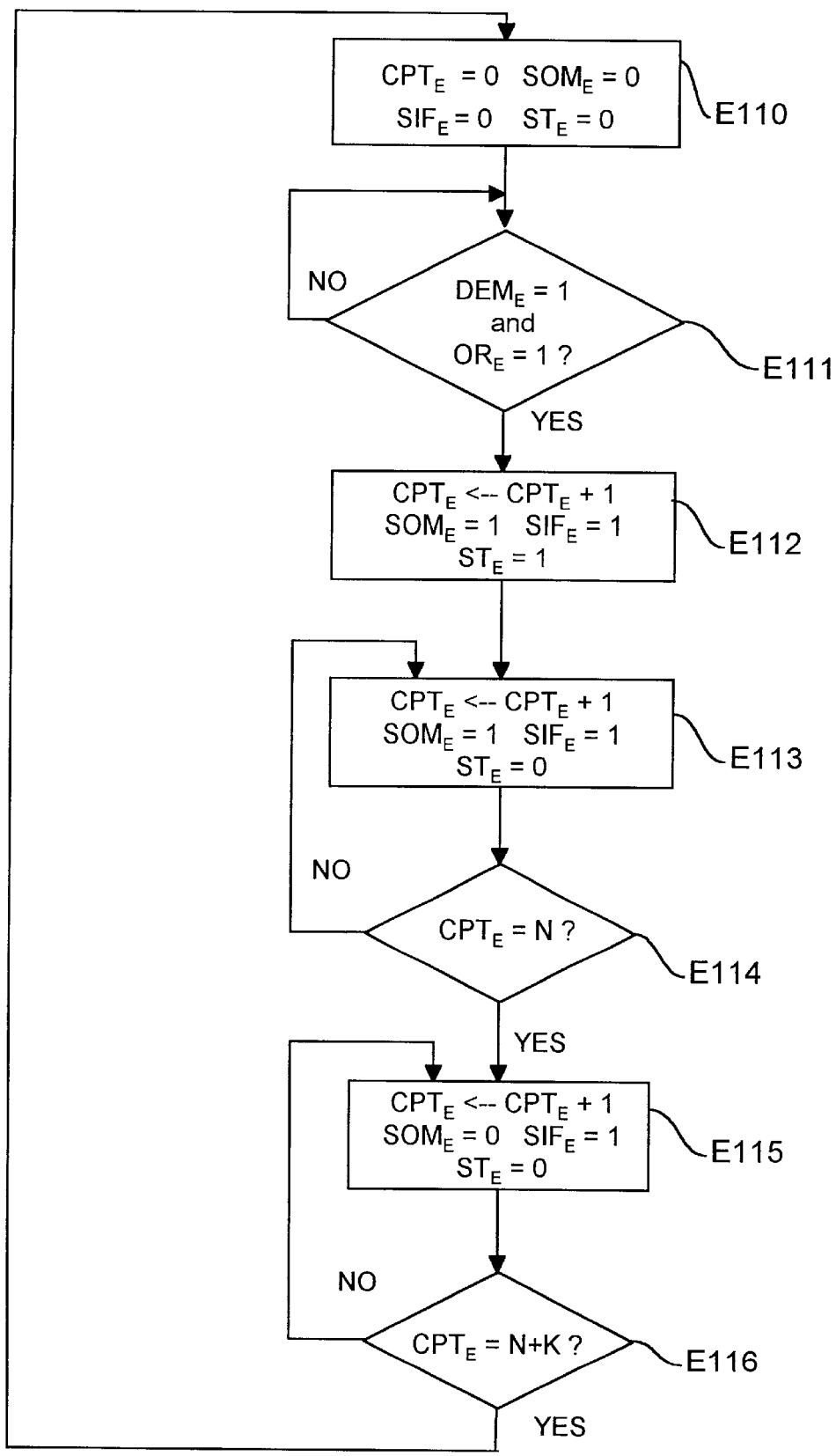
Figure 13:
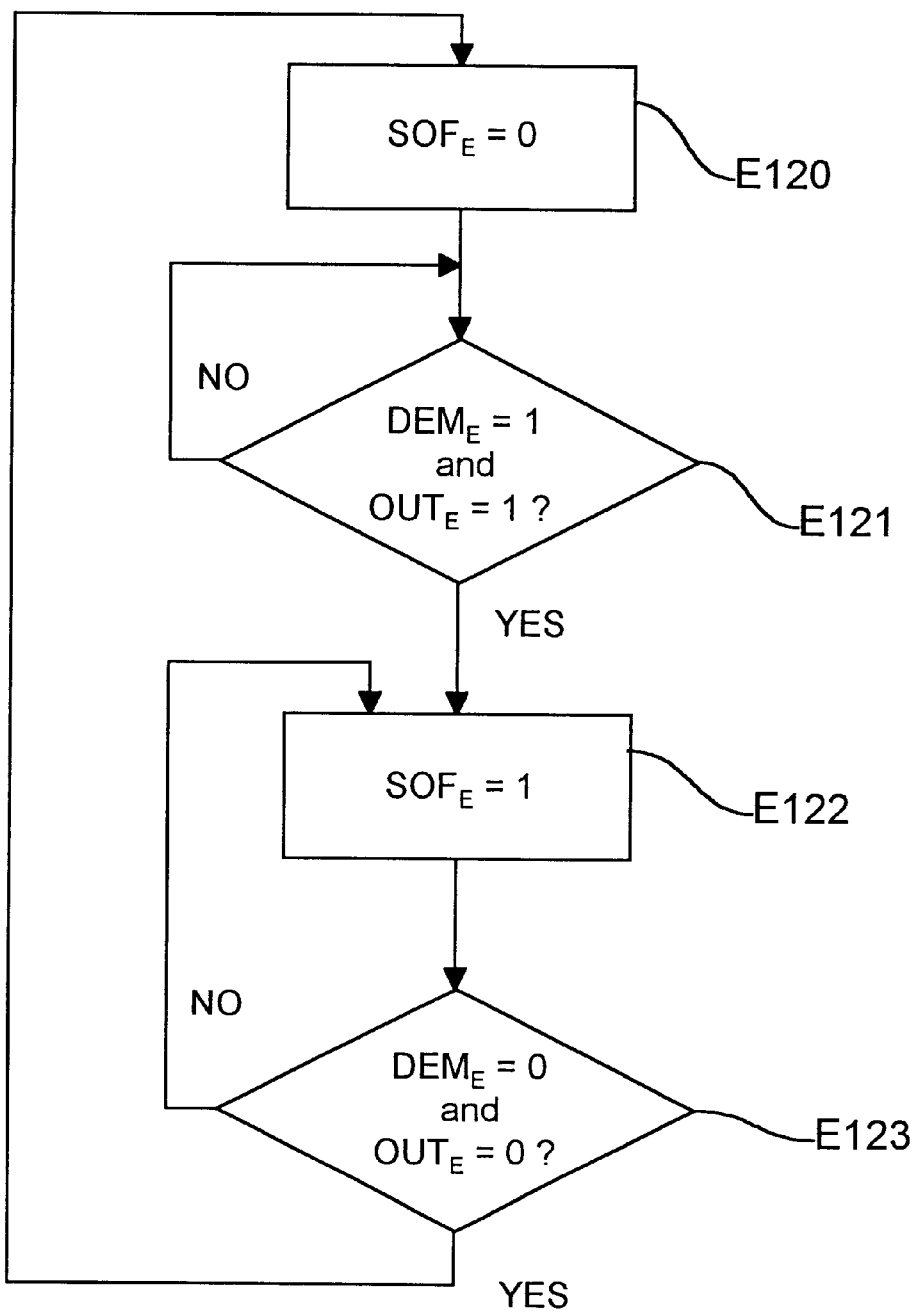
Figure 14:
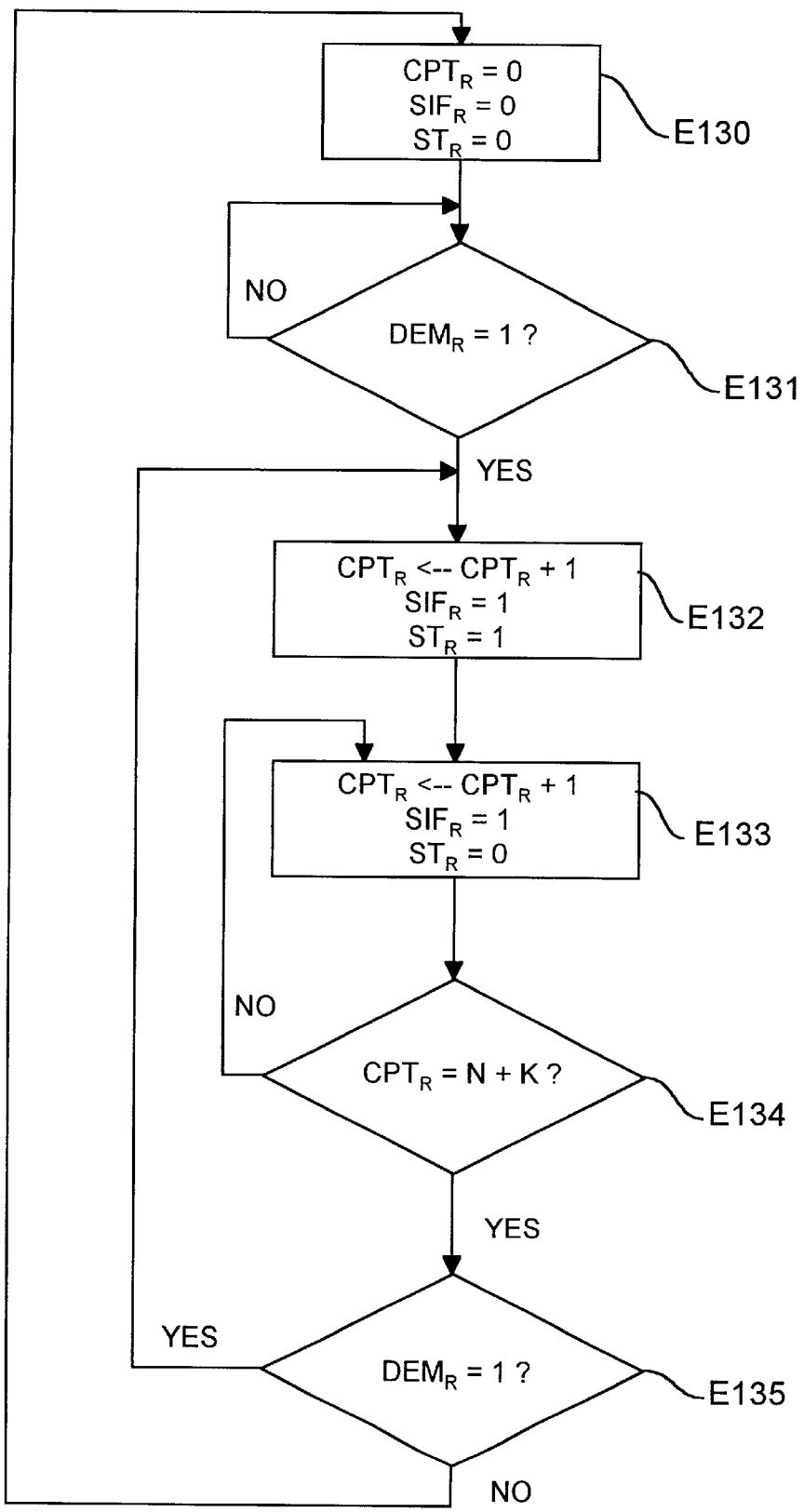
Figure 15:
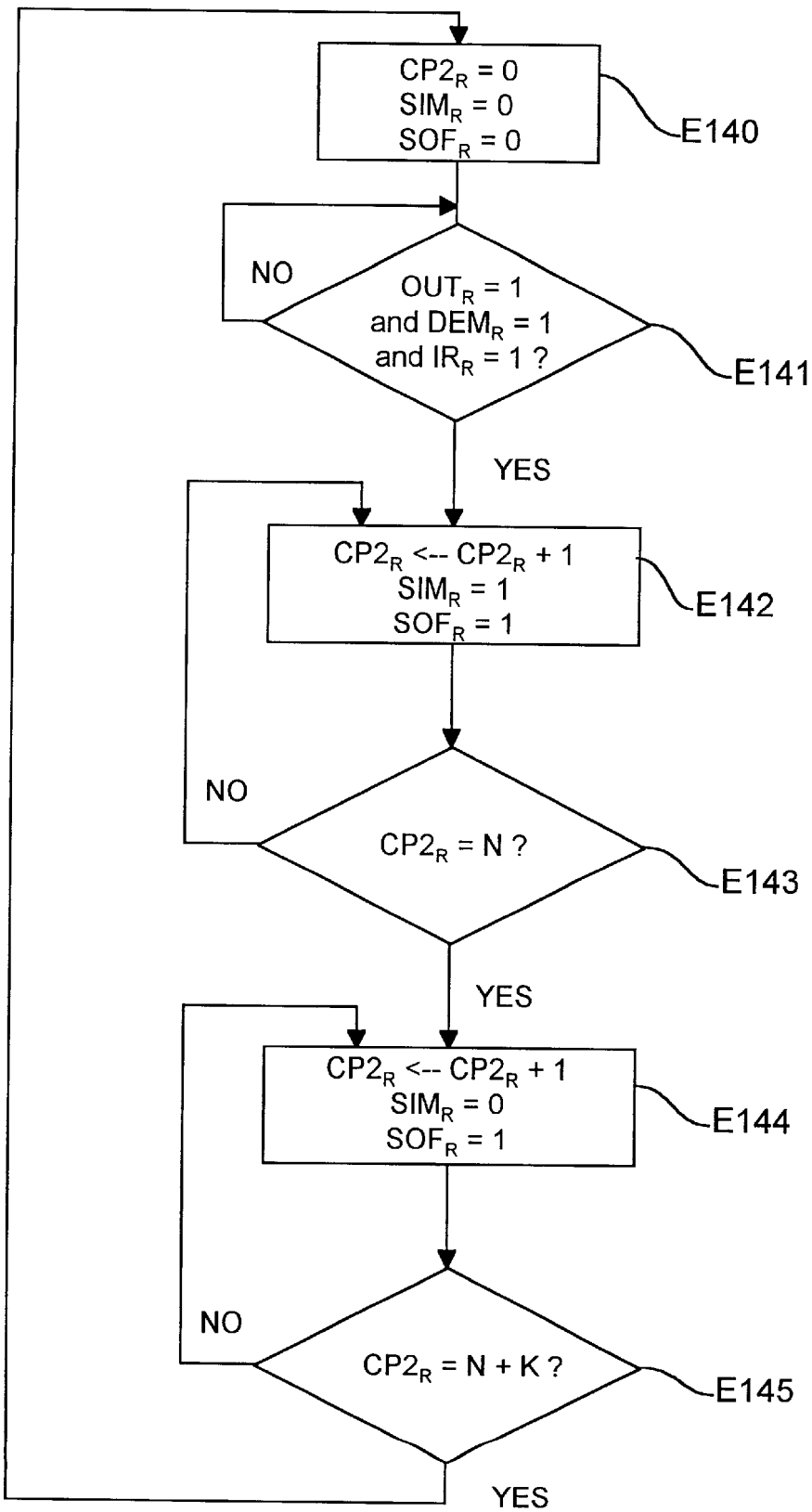
Figure 16:
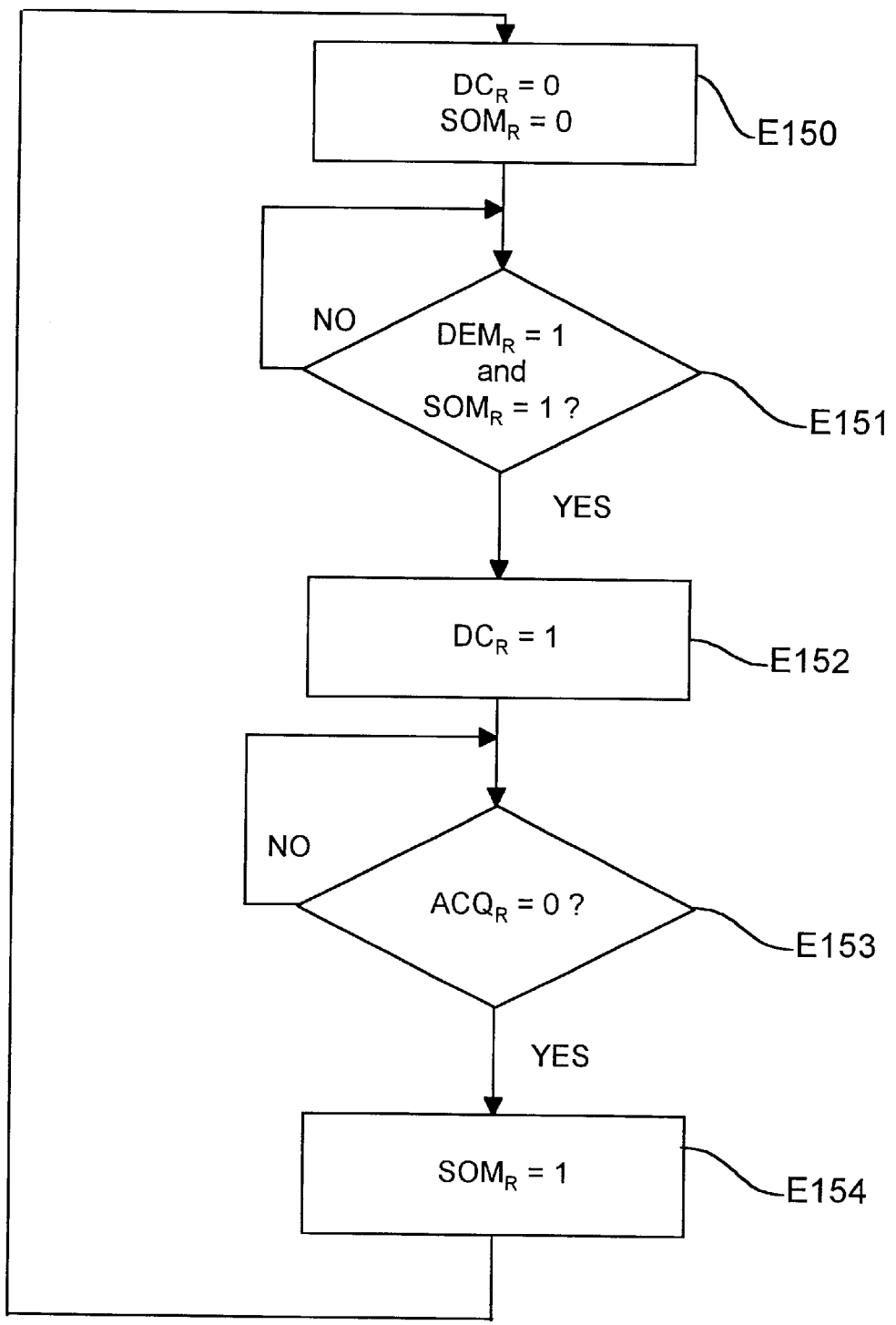

The characteristics and advantages of the present invention will emerge more clearly from a reading of several embodiments illustrated by the accompanying drawings, in which:

FIG. 1 is a block diagram of a first embodiment of a sending and receiving device according to the invention, FIG. 2 depicts a block diagram for the management of the data buses at the input and output of an error correction circuit included in the device of FIG. 1, FIG. 3 depicts control signals and state signals used in the device of FIG. 1, FIG. 4 depicts the operating algorithm of the sending and receiving device according to the invention, FIG. 5 depicts a data transfer algorithm for the reception of data, included in the algorithm of FIG. 4, FIG. 6 depicts a data transfer algorithm for the sending of data, included in the algorithm of FIG. 4, FIG. 7 is a block diagram of a second embodiment of a sending and receiving device according to the invention, FIG. 8 depicts an error correction code word formed in the device of FIG. 7, FIGS. 9a to 9c depict sequences of octets passing through the device of FIG. 7, FIG. 10 depicts the control signals and state signals used in the device of FIG. 7, FIGS. 11 to 13 depict data transfer algorithms for the sending of data, and FIGS. 14 to 16 depict data transfer algorithms for the reception of data.

In the first embodiment chosen and depicted in FIG. 1, a data coding and decoding device is a data sending and receiving device having a main memory 1 in which data are stored. The data sending and receiving device is connected, via the memory 1 to a data processing device 10, known per se. The device 10 can be a computer, or a processing terminal, connected by a data bus to the memory 1.

The device 10 can be used conventionally to configure operating parameters for the different circuits of the data sending and receiving device, for example for initialising the circuit 4, which will be detailed subsequently.

The data sending and receiving device can also be integrated into a data processing device 100 or into a communication device 100, such as a computer, a printer, or a facsimile apparatus. The memory 1 is then connected to a data processing circuit internal to the data processing device or communication device.

The main memory 1 is connected by a bidirectional bus $B_1$ to a logic controller 3 which controls the data transfers internal to the sending and receiving device. The logic controller 3 can be a programmable circuit, for example of the FPGA (Field Programmable Gate Array) type, or a circuit of the ASIC (Application Specific Integrated Circuit) type. The logic controller 3 is described in detail hereinafter.

A direct access circuit 2, referred to as a DMA (Direct Access Memory) circuit, affords bidirectional access, direct to the main memory 1. The circuit 2 here uses two channels in a monodirectional fashion, which form a sending channel and a receiving channel. This circuit has the advantage of affording very rapid access to the main memory 1.

The logic controller 3 is connected to a data coding and decoding circuit, here an error correction circuit 4, by means of a monodirectional bus $B_3$. The error correction circuit 4 is an FEC (Forward Error Correction) circuit which codes the data to be sent and decodes the data received. The error correction circuit 4 is therefore alternately a coder and a decoder, as detailed hereinafter. The coding and decoding are performed according to an algorithm of the VITERBI type, suitable when the errors are not grouped together, or according to an algorithm of the REED-SOLOMON type, suitable in the case of errors in packets. The latter type of error correction will be considered more particularly hereinafter.

The error correction circuit 4 is connected by a monodirectional bus $B_4$ to a sending circuit 5 which sends the data over a transmission channel.

A receiving circuit 6 receives data via the transmission channel and is connected by a monodirectional bus $B_2$ to the logic controller 3. The data received are coded and must be decoded by the error correction circuit 4.

The sending and receiving of data operate in half-duplex mode. First of all, in the sending direction, data to be sent are transmitted between the memory 1 and the error correction circuit 4, via the logic controller 3. The data are in the form of a sequence of octets forming a useful message. All the N octets received, where N is an integer equal to 25 by way of example, the circuit 4 inserts K redundant octets, which K is an integer equal to 6 by way of example. N useful octets $OC_1$, to $OC_N$ and K redundant octets $OR_1$ to $OR_K$ form an error correction code word MC. The K redundant octets $OR_1$, to $OR_K$ are determined by the error correction circuit 4, according to a REED-SOLOMON algorithm, in order to correct K/2 possible errors in the error correction code word.

The error correction circuit 4 supplies the error correction code words to the sending circuit 5, which sends them over the transmission channel.

Moreover, in the receiving direction, the receiving circuit 6 receives, from the transmission channel, data coded in the form of a code word MC and transmits them to the logic controller 3, which transmits them to the error correction circuit 4.

The error correction circuit 4 decodes the data received by performing, overall, decoding operations which are the reverse of the coding operations performed on sending. The error correction circuit 4 receives error correction code words MC including N useful octets $OC_1$ to $OC_N$ and K redundant octets $OR_1$ to $OR_K$. The circuit 4 uses the K redundant octets to detect and correct any errors in the words received. The decoding results in decoded words MD containing the N useful message octets, if necessary corrected by virtue of the redundant octets, and K redundant octets $OR_1$ to $OR_K$ which no longer have any role.

The circuit 4 transfers the decoded words to the logic controller 3 via the bus $B_4$ for the purpose of storing the useful message octets $OC_1$ to $OC_N$ in the main memory 1.

FIG. 2 shows the management of the data buses of the data sending and receiving device.

In general terms, the error correction circuit 4 receives data via the bus $B_3$. After processing of the data, coding or decoding, the circuit 4 supplies the processed data over the bus $B_4$.

Control of the data flows makes it possible on the one hand to selectively connect the bus $B_1$ or the bus $B_2$ to the bus $B_3$ and on the other hand to selectively connect the bus $B_4$ to the sending circuit or to the bus $B_1$: to do this, the logic controller 3 controls "switches" at the input and output of the error correction circuit 4.

In the preferred embodiment, the switching and control functions are combined in the logic controller 3.

Thus the bus $B_1$, is connected to a storage flip-flop 31, itself connected to a first input EN1 of a multiplexer 32 whose output S1 is connected to the bus $B_3$. The bus $B_2$ is connected to a second input EN2 of the multiplexer 32. The bus 34 is connected to the bus $B_1$ via a three-state bus control unit 33.

A logic control signal COM1 controls the operation of the flip-flop 31, to switch the data present on the bus $B_1$ to the multiplexer 32, when the signal COM1 is at the low state. A logic control signal COM2 selectively connects the first input EN1 of the multiplexer 32 to its output S1 when the signal COM2 is at the low state, or the second input EN2 to the output S1, when the signal COM2 is at the high state. A logic control signal COM3 controls the passage of the data present on the bus $B_4$ to the bus $B_1$, when the signal COM3 is at the high state, and prevents its passage otherwise.

As a variant, the switching and control functions can be implemented in distinct circuits.

FIG. 3 depicts a block diagram of the logic signals exchanged between the logic controller 3 and the direct access circuit 2, the error correction circuit 4, the sending circuit 5, the receiving circuit 6 and the data processing circuit 10. Some of these signals control the data transfers between the main memory 1 and the sending circuit 5 and receiving circuit 6, as well as the operation of the circuits involved in the sending and receiving of data. Other ones of these signals represent operating states of the different circuits, relating to the transfer of data.

The logic controller 3 supplies the following logic signals to the error correction circuit 4:

a clock signal CLK, of frequency equal to 20 MHz,
  a signal IN for instructing the error correction circuit 4 to take into account the octet which is supplied to it at its input (bus $B_3$), when the signal IN is at the low state simultaneously with a rising edge of the clock signal CLK,
  a signal OUT for instructing the error correction circuit 4 to supply an octet at its output (bus $B_4$), when the signal OUT is at the low state simultaneously with a rising edge of the clock signal CLK,
  a signal HR for indicating to the error correction circuit 4 that the octet which is supplied to it as an input (bus $B_3$) is a redundant octet or a padding octet, when the signal HR is at the high state.

The error correction circuit 4 supplies the following logic signals to the logic controller 3:

a signal AIN for indicating to the logic controller 3 that the circuit 4 is not full, and that it can receive an octet, when the signal AIN is at the low state, a signal AOUT for indicating to the logic controller 3 that the circuit 4 is ready to transmit an octet, when the signal AOUT is at the low state.

The logic controller 3 supplies the following logic signals to the direct access circuit 2:

a signal $DC_E$ for asking a direct access channel for a sending of data, between the main memory 1 and the logic controller 3, when the signal $DC_E$ goes to the high state, a signal $DC_R$ for asking a direct access channel for a reception of data, between the logic controller 3 and the main memory 1, when the signal $DC_R$ goes to the high state.

The direct access circuit 2 supplies the following logic signals to the logic controller 3:

a signal $ACQ_E$ in response to the signal $DC_E$, in order to acknowledge the request for a direct access channel for sending. When the signal $ACQ_E$ goes to the low state, this means that the direct access circuit 2 is performing the transfer of data between the main memory 1 and the logic controller 3, a signal $ACQ_R$ in response to the signal $DC_R$ in order to acknowledge the request for a direct access channel for receiving. When the signal $ACQ_R$ goes to the low state, this means that the direct access circuit 2 is performing the transfer of data between the logic controller 3 and the main memory 1.

The sending circuit 5 supplies a signal $DEM_E$ to the logic controller 3. The signal $DEM_E$ is an authorisation to send data when it goes to the high state.

The receiving circuit 6 supplies a signal $DEM_R$ to the logic controller 3. The signal $DEM_R$ indicates that a data reception is detected by the circuit 6 when it goes to the high state.

The data processing circuit 10 supplies a signal $DO_E$ to the logic controller 3. The signal $DO_E$ indicates that the data present in the memory 1 are ready to be sent, when it goes to the high state.

FIG. 4 shows the operating algorithm for the device of FIG. 1. This algorithm can be, totally or partially, memorised in any storage medium SM1 capable of cooperating with the logic controller 3. This storage medium is integrated or can be detachably mountable on the data coding and decoding device. For example, the storage medium is a floppy disk, or a CR-ROM. The algorithm includes steps E1 to E7, which are run through cyclically.

Step E1 is the energising of the data sending and receiving device.

At the following step E2, the logic controller 3 initialises the error correction circuit 4 in decoding mode, according to a procedure which depends on the type of error correction circuit used. This procedure consists for example of transmitting control signals and/or configuration octets to the circuit 4, in order to program it in decoding mode. This initialisation makes it possible notably to fix the values of the parameters N and K.

Step E2 is followed by step E3, which is a test for verifying whether a data reception is detected by the circuit 6, by verifying whether the signal $DEM_R$ is at the high state. When the response is positive, the logic controller 3 generates, at step E4, the appropriate signals for the device to process the data received and to store them in the memory 1. Step E4 is detailed with reference to FIG. 5 and is followed by step E3.

When no reception is detected at step E3, step E5 is a test for verifying whether the data are to be sent and whether the sending circuit 5 is ready for sending, which corresponds to the two signals $DO_E$ and $DEM_E$ at the high state. If the response is negative, step E5 is followed by step E3.

If there are data to send, step E5 is followed by step E6 in which the logic controller 3 initialises the error correction circuit 4 in sending mode, or coding mode, according to a procedure which depends on the type of error correction circuit used. This procedure consists for example of transmitting control signals and/or configuration octets to the circuit 4, in order to program it in coding mode.

Step E6 is followed by step E7, in which the logic controller 3 generates the appropriate signals for data to be sent to be transmitted from the memory 1 to the sending circuit 5, via the logic controller 3 and error correction circuit 4. Step E7 is detailed hereinafter with reference to FIG. 6.

Step E7 is followed by step E2, in which the circuit 4 is reinitialised in decoding mode.

It will be noted that, according to this embodiment, the coding and decoding circuit 4 is in decoding mode by default, and that it goes to coding mode when there are data to be sent. This functioning gives priority to decoding and is suited to cases where it is not known when a remote device is sending its data.

For different applications, it is possible to initialise the device in coding mode by default, in order to give priority to coding.

According to FIG. 5, step E4 of receiving data includes substeps E40 to E51 which are run through cyclically.

Step E40 is an initialisation in which the logic controller initialises a counter CPT1 at zero, and transmits the following signals to the error correction circuit 4:

the signal IN at the high state in order to instruct not to take into account data supplied at the input of the error correction circuit 4, the signal HR at the low state in order to indicate that octets supplied at the input of the error correction circuit are not redundant or padding octets, the signal OUT at the high state in order to instruct the error correction circuit 4 not to supply an octet at its output.

The logic controller transmits the signal $DC_R$ at the low state to the direct access circuit 2, in order not to request a channel in receiving mode from the direct access circuit 2.

The logic controller 3 puts the control signal COM2 at the high state in order to instruct the multiplexer 32 to connect the buses $B_2$ and $B_3$. Thus the data supplied by the receiving circuit 6, via the bus $B_2$, are transmitted to the error correction circuit 4 via the bus $B_3$. The logic controller 3 puts the control signal COM3 at the low state so that the data present on the bus $B_4$ do not pass over the bus $B_1$.

Step E40 is followed by steps E41 and E47. Steps E41 to E46 on the one hand, and steps E47 to E50 on the other hand, form two branches which are run through simultaneously and independently of each other. Passage from one step to the following is effected in accordance with clock frequencies which can be different for the two branches.

Steps E41 to E46 make it possible to transfer data received by the receiving circuit 6 to the error correction circuit 4, via the logic controller 3.

Step E41 is a test on the value of the signal AIN, in order to determine whether the error correction circuit 4 is ready to receive data (signal AIN at the low state). As long as the response is negative, step E41 is repeated.

When the response to step E41 is positive, step E41 is followed by step E42, in which the logic controller 3 supplies the signal IN at the low state to the error correction circuit 4, so that an octet supplied to the error correction circuit 4 is taken into account by this circuit. The counter CPT1 is incremented by one unit.

Step E42 is followed by step E43, which is a test on the value of the counter CPT1. As long as the counter CPT1 has not reached the value N, corresponding to the number of useful octets of an error correction code word MC, steps E41 and E42 are repeated.

When the counter CPT1 reaches the value N, this means that N octets have been transmitted to the error correction circuit 4; step E43 is then followed by step E44, analogous to step E41. Step E44 is a test on the value of the signal AIN, in order to determine whether the error correction circuit 4 is ready to receive data (signal AIN at the low state). As long as the response is negative, step E44 is repeated.

When the response to step E44 is positive, step E44 is followed by step E45, in which the logic controller 3 supplies the signal IN at the low state to the error correction circuit 4, so that an octet supplied to the error correction circuit 4 is taken into account by this circuit. The counter CPT1 is incremented by one unit. The logic controller 3 supplies the signal HR at the high state to the error correction circuit 4, in order to indicate to it that the octets which are supplied to it are redundant octets.

Step E45 is followed by step E46, which is a test on the value of the counter CPT1. As long as the counter CPT1 has not reached the value N+K, corresponding to the total number of octets of an error correction code word MC, steps E44 and E45 are repeated.

When the counter CPT1 reaches the value N+K, this means that steps E44 and E45 have been repeated for all the redundant octets of an error correction code word. Step E46 is then followed by step E51, which is analogous to step E3, and which is a test for verifying whether the reception of data has ended, that is to say whether the signal $DEM_R$ is at the low state. As long as the response is negative, steps E40 to E46 are repeated.

When the reception of data is ended, step E51 is followed by step E3 previously described.

Steps E47 to E50 make it possible to transfer data received and decoded by the error correction circuit 4 to the memory 1, via the logic controller 3.

Step E47 is a test on the value of the signal AOUT. As long as the signal AOUT is not at the low state, step E47 is repeated.

When the error correction circuit 4 supplies the signal AOUT at the low state to the logic controller 3, this means the data are ready at the output of the error correction circuit 4.

In this case, step E47 is followed by step E48, at which the logic controller 3 supplies the signal OUT at the low state to the error correction circuit 4, in order to instruct it to supply an octet on the bus $B_4$. The logic controller 3 also supplies the signal $DC_R$ at the high state in order to request a channel to the main memory 1.

The following step E49 is a test on the value of the signal $ACQ_R$. As long as the signal $ACQ_R$ is at the high state, step E49 is repeated.

When the signal $ACQ_R$ goes to the low state, this means that a channel to the main memory 1 is available for the transfer of data. Step E49 is followed by step E50, in which the logic controller 3 puts the control signal COM3 at the high state in order to connect the bus $B_4$ to the bus $B_1$, so that the octets leaving the error correction circuit 4 are sent over the bus $B_1$ to the memory 1.

The logic controller 3 supplies the signal OUT at the high state to the error correction circuit 4, in order to instruct the error correction circuit 4 not to supply an octet on the bus $B_3$.

The logic controller 3 supplies the signal $DC_R$ at the low state to the direct access circuit 2 in order to deactivate its request for a channel.

Step E50 is followed by step E51 previously described. Steps E40 to E50 are repeated as long as the reception of data is not ended, that is to say as long as the response to step E51 is negative.

Step E7 of sending data is detailed with reference to FIG. 6, and includes substeps E70 to E83 which are run through cyclically.

Step E70 is an initialisation in which the logic controller 3 initialises a counter CPT2 at zero, and transmits the following signals to the error correction circuit 4:

the signal IN at the high state in order to give instructions not to take into account data supplied at the input of the error correction circuit, the signal OUT at the high state in order to instruct the error correction circuit 4 not to supply an octet at its output, the signal HR at the low state in order to indicate that octets supplied to the error correction circuit 4 are not redundant octets.

The logic controller 3 transmits the signal $DC_E$ at the low state to the direct access circuit 2, in order not to request a sending channel between the main memory 1 and the logic controller 3.

The control signal COM1 is put at the high state in order not to switch the data onto the bus $B_1$, and the signal COM2 is put at the low state in order to connect the buses $B_1$ and $B_3$.

Step E70 is followed by steps E71 and E81. Steps E71 to E80 on the one hand, and steps E81 to E83 on the other hand, form two branches which are run through simultaneously and independently of each other. In these two branches, passing from one step to the following is effected at each switching of a clock, which can be different from one branch to the other.

Steps E71 to E80 make it possible to transmit N useful octets and K padding octets between the memory 1 and the error correction circuit 4, so that the circuit 4 can form an error correction code word.

At step E71, the logic controller 3 transmits the signal $DC_E$ at the high state in order to request a sending channel to the direct access circuit.

The following step E72 is a test of the value of the signal AIN. As long as the signal AIN is at the high state, step E72 is repeated. When the signal AIN goes to the low state, this means that the error correction circuit 4 can receive octets.

The following step E73 is a test for verifying whether the signal $ACQ_E$ is at the low state. As long as the signal $ACQ_E$ is at the high state, step E73 is repeated.

When the signal $ACQ_E$ goes to the low state, step E73 is followed by step E74, in which the signal COM1 is put at the low state in order to switch the data onto the bus $B_1$, and the logic controller 3 transmits the signal $DC_E$ at the low state to the direct access circuit in order to release the channel.

Step E74 is followed by step E75, which is a test on the value of the counter CPT2.

As long as the counter CPT2 has not reached the value N, step E75 is followed by step E76, in which:

the logic controller 3 increments the counter CPT2 by one unit, the logic controller 3 transmits the signals IN and HR at the low state to the error correction circuit 4, so that an octet supplied to the error correction circuit 4 is taken into account by it, and to indicate to it that this octet is not a redundant octet.

Step E76 is followed by step E71.

When the counter CPT2 has reached the value N at step E75, this means that step E76 has been run through for N useful octets $OC_1$ to $OC_N$ and that consequently N octets have been transmitted between the memory 1 and the logic controller 3. Step E75 is then followed by step E77, in which:

the logic controller 3 increments the counter CPT2 by one unit, the logic controller 3 transmits the signals IN and HR at the low state and high state respectively, to the error correction circuit 4, so that an octet supplied to the error correction circuit 4 is taken into account by it, and to indicate to it that this octet is a padding octet.

Step E77 is followed by step E80, which is a test on the value of the counter CPT2. If the counter CPT2 has not reached the value N+K, step E80 is followed by step E71.

When the counter CPT2 reaches the value N+K, this means that step E77 has been run through for K padding octets $Or_1$ to $Or_K$ and that consequently N+K octets have been transmitted between the memory 1 and the logic controller 3. Step E80 is then followed by step E83, which is a test for the end of the transmission, that is to say it tests whether the signal $DO_E$ is at the low state.

If the transmission is not ended, step E83 is followed by step E71. If the transmission is ended, step E83 is followed by step E2 previously described.

Steps E81 and E82 make it possible to transfer an octet between the error correction circuit 4 and the sending circuit 5.

Step E81 is a test on the value of the signal AOUT. As long as the signal AOUT is at the high state, step E81 is repeated.

When the signal AOUT goes to the low state, this means that the error correction circuit 4 has formed at least one code word MC which is ready to be sent. Step E81 is then followed by step E82, in which the logic controller 3 supplies the signal OUT at the low state to the error correction circuit 4, in order to instruct it to supply an octet to the sending circuit, via the output bus $B_4$. Step E82 is followed by step E83 previously described.

In the second embodiment chosen and depicted in FIG. 7, a data sending and receiving device has a main memory 11 in which data are stored. The data sending and receiving device is connected, via the memory 11, to a data processing device 20, known per se. The device 20 can be a computer, or a processing terminal, connected to the memory 11 by a data bus.

The data sending and receiving device can also be integrated into a data processing device 200 or into a communication device 200, such as a computer, a printer or a facsimile apparatus. The memory 11 is then connected to a data processing circuit internal to the data processing device, or communication device.

The main memory 11 is connected to a circuit 12 for direct access to the main memory 11, referred to as a DMA (Direct Access Memory) circuit, which allows bidirectional access direct to the main memory 11. The circuit 12 here uses two channels in a monodirectional fashion, which form a sending channel and a receiving channel. This circuit has the advantage of allowing very rapid access to the main memory 11.

First of all in the sending direction the direct access circuit 12 is connected to a buffer memory 13 of the FIFO type (First In, First Out), itself connected to a data coding circuit, here an error correction circuit 14. The error correction circuit 14 is an FEC (Forward Error Correction) circuit which codes the data to be sent, according to an algorithm of the VITERBI type, appropriate when the errors are not grouped, or according to an algorithm of the REED-SOLOMON type, appropriate in the case of errors in packets. This last type of error correction will be more particularly considered and detailed hereinafter.

The error correction circuit 14 is connected to a sending circuit 15, which sends the data over a transmission channel.

The error correction circuit 14 receives data in the form of a sequence of words, for example octets, forming a useful message, and receives padding data in the form of padding words, here octets.

The error correction circuit 14 thus receives N octets of useful data followed by K padding octets, where N is an integer equal to 26 by way of example and K is an integer equal to 6 by way of example. When all the N octets have been received, the circuit 14 replaces the K padding octets with K redundant octets. The N useful octets $OC_1$ to $OC_N$ and the K redundant octets $OR_1$ to $OR_k$ form an error correction code word MC as depicted in FIG. 8. The K redundant octets $OR_1$, to $OR_K$ are determined by the error correction circuit 14, according to a Reed-Solomon algorithm, for correcting K/2 possible errors in the error correction code word.

In addition, in the receiving direction, a receiving circuit 18 receives data from the transmission channel. The receiving circuit 18 is connected to a data decoding circuit, here an error correction circuit 17. The error correction circuit 17 is connected to a buffer memory 16 of the FIFO type, similar to the buffer memory 13. The buffer memory 16 is connected to the direct access circuit 12, itself connected to the main memory 11.

The error correction circuit 17 overall performs decoding operations which are the reverse of the coding operations of the circuit 14. The error correction circuit 17 receives error correction code words MC having N useful octets $OC_1$ to $OC_N$ and K redundant octets $OR_1$, to $OR_K$. The circuit 17 uses the K redundant octets for detecting and correcting any errors in the words received. The decoding results in decoding words containing the N useful message octets, if necessary corrected by means of the redundant octets, and K redundant octets $OR_1$ to $OR_K$ which no longer have any role.

The circuit 17 transfers the decoded words to the buffer memory 16, for the purpose of storing the useful message octets $OC_1$ to $OC_N$ in the main memory 11.

An automatic control device 19 is connected to the direct access circuit 12, to the buffer memories 13 and 16 and to the error correction circuits 14 and 17, as will be detailed later.

The coding and decoding operations performed by the error correction circuits 14 and 17 are illustrated by FIGS. 9a to 9c.

FIG. 9a depicts schematically a sequence of useful octets entering or leaving the main memory 11. FIG. 9b depicts the sequence of octets entering the error correction circuit 14. This sequence includes an alternation of N useful octets $OC_1$ to $OC_N$ and K padding octets $Or_1$ to $Or_K$. FIG. 9c depicts the sequence of octets leaving the error correction circuit 14 or entering or leaving the error correction circuit 17. This sequence includes an alternation of N useful octets $OC_1$ to $OC_N$ and K redundant octets $OR_1$, to $OR_K$. The K redundant octets are determined on sending, by the error correction circuit 14, which inserts them in place of the padding octets.

According to other embodiments, the coding circuit is a data encripting circuit. The coding circuit then inserts a key formed by a certain number of octets following each of the coded useful data blocks. The corresponding decoding circuit uses the key for decoding the block of coded useful data. Other types of coding/decoding can be used in the scope of the invention.

FIG. 10 shows a block diagram of the logic signals exchanged between the automatic control device 19 and the direct access circuit 12, the buffer memories 13 and 16 and the error correction circuits 14 and 17. Some of these signals control the data transfers between the main memory 11 and the sending 15 and receiving 18 circuits, as well as the operation of the circuits involved in the sending and receiving of data. Other ones of these signals represent operating states of the different circuits, relating to the transfer of data. Some of these signals are identical to signals used in the first embodiment.

The automatic control device 19 receives signals $DEM_E$ and $DEM_R$ from the circuits 15 and 18 respectively. The signal $DEM_E$ is an authorisation to send data when it goes to the high state. The signal $DEM_R$ indicates that a reception of data is detected by the circuit 18 when it goes to the high state.

The automatic control device 19 transmits signals $DC_E$ and $DC_R$ to the direct access circuit 12. The signal $DC_E$ is a request for a direct access channel for sending data, between the main memory 11 and the buffer memory 13, when it goes to the high state. The signal $DC_R$ is a request for a direct access channel for receiving data, between the memory 16 and the main memory 11, when it goes to the high state.

The direct access circuit 12 transmits signals $ACQ_E$ and $ACQ_R$ to the automatic control device 19 in response to the signals $DC_E$ and $DC_R$ respectively. The signal $ACQ_E$ is an acknowledgement of a request for a direct access channel for sending. When the signal $ACQ_E$ goes to the low state, this means that the direct access circuit 12 executes the transfer of data between the main memory 11 and the buffer memory 13. The signal $ACQ_R$ is an acknowledgement of a request for a direct access channel for receiving. When the signal $ACQ_R$ goes to the low state, this means that the direct access circuit 12 performs the transfer of data between the memory 16 and the main memory 11.

The automatic control device 19 transmits signals $SIM_E$ and $SIM_R$ respectively to the buffer memories 13 and 16. The signal $SIM_E$ indicates that an octet is presented at the input of the buffer memory 13 when it goes to the high state. The signal $SIM_R$ indicates that an octet is presented at the input of the memory 16 when it goes to the high state.

The buffer memory 13 and the buffer memory 16 transmit respectively signals $IR_E$ and $IR_R$ to the automatic control device 19. The signal $IR_E$ indicates that the buffer memory 13 is ready to receive data. The signal $IR_R$ indicates that the buffer memory 16 is ready to receive data.

The automatic control device 19 transmits signals $SOM_E$ and $SOM_R$ respectively to the buffer memories 13 and 16. The signal $SOM_E$ is an instruction to transmit an octet from the buffer memory 13 to the error correction circuit 14, when it goes to the high state. The signal $SOM_R$ is an instruction to transmit an octet from the memory 6 to the memory 11, via the direct access circuit 12, when it goes to the high state.

The automatic control device 19 transmits signals $SOF_E$ and $SOF_R$ respectively to the error correction circuits 14 and 17. The signal $SOF_E$ is an instruction to transmit an octet from the error correction circuit 14 to the sending circuit 15. The signal $SOF_R$ is an instruction to transmit an octet from the error correction circuit 17 to the buffer memory 16.

The buffer memory 13 transmits a signal $OR_E$ to the automatic control device 19. The signal $OR_E$ indicates that the buffer 13 contains data to be sent when it is at the high state.

The buffer memory 16 transmits a signal $OR_R$ to the automatic control device 19. The signal $OR_R$ indicates that the memory 16 contains data being received when it is at the high state.

The automatic control device 9 transmits signals $SIF_E$ and $SIF_R$ respectively to the error correction circuits 14 and 17. The signal $SIF_E$ indicates that an octet is presented at the input of the error correction circuit 14, when it is at the high state. The signal $SIF_R$ indicates that an octet is presented at the input of the error correction circuit 17, when it is at the high state.

The automatic control device 19 transmits signals $ST_E$ and $ST_R$ respectively to the error correction circuits 14 and 17. The signal $ST_E$ indicates the start of a block of useful data presented at the error correction circuit 14 when it goes to the high state. The signal $ST_R$ indicates the start of a block of useful data presented at the error correction circuit 17 when it goes to the high state.

The error correction circuits 14 and 17 transmit respectively signals $OUT_E$ and $OUT_R$ to the automatic control device 19. The signal $OUT_E$ indicates that the error correction circuit 14 has useful octets present at an output, or that these useful octets are in the course of transmission to the sending circuit 15, when it is at the high state. When the signal $OUT_E$ is at the low state, it indicates either that redundant octets are in the course of transmission to the sending circuit 15, or that no octet is in the course of transmission between the circuit 14 and the circuit 15.

Similarly, the signal $OUT_R$ indicates that the error correction circuit 17 has useful octets present at its output, and that useful octets are in the course of transmission to the memory 16 when it is at the high state. When the signal $OUT_E$ is at the low state, it indicates either that redundant octets are present at the output of the circuit 17, or that no octet is in the course of transmission between the circuit 17 and the circuit 16.

The sending and receiving of data are independent of each other and can function equally well in full duplex or half-duplex.

The operating of the device of FIG. 7 will now be described by algorithmes which can be, totally or partially, memorised in any storage medium SM2 capable of cooperating with the control device 19.

This storage medium is integrated or can be detachably mountable on the data sending and receiving device. For example, the storage medium is a floppy disk, or a CD-ROM.

The sending of data will be dealt with first of all, described with reference to FIGS. 10, 11, 12 and 13. The sending of data entails data transfers between the main memory 11, the direct access circuit 12, the buffer memory 13, the error correction circuit 14 and the sending circuit 15. These transfers are controlled by the automatic controller 19 and are described in the form of algorithms.

The data transfers necessary for the sending of data and described with reference to FIGS. 11, 12 and 13 can be effected simultaneously, whilst being asychronous.

Figure 11:
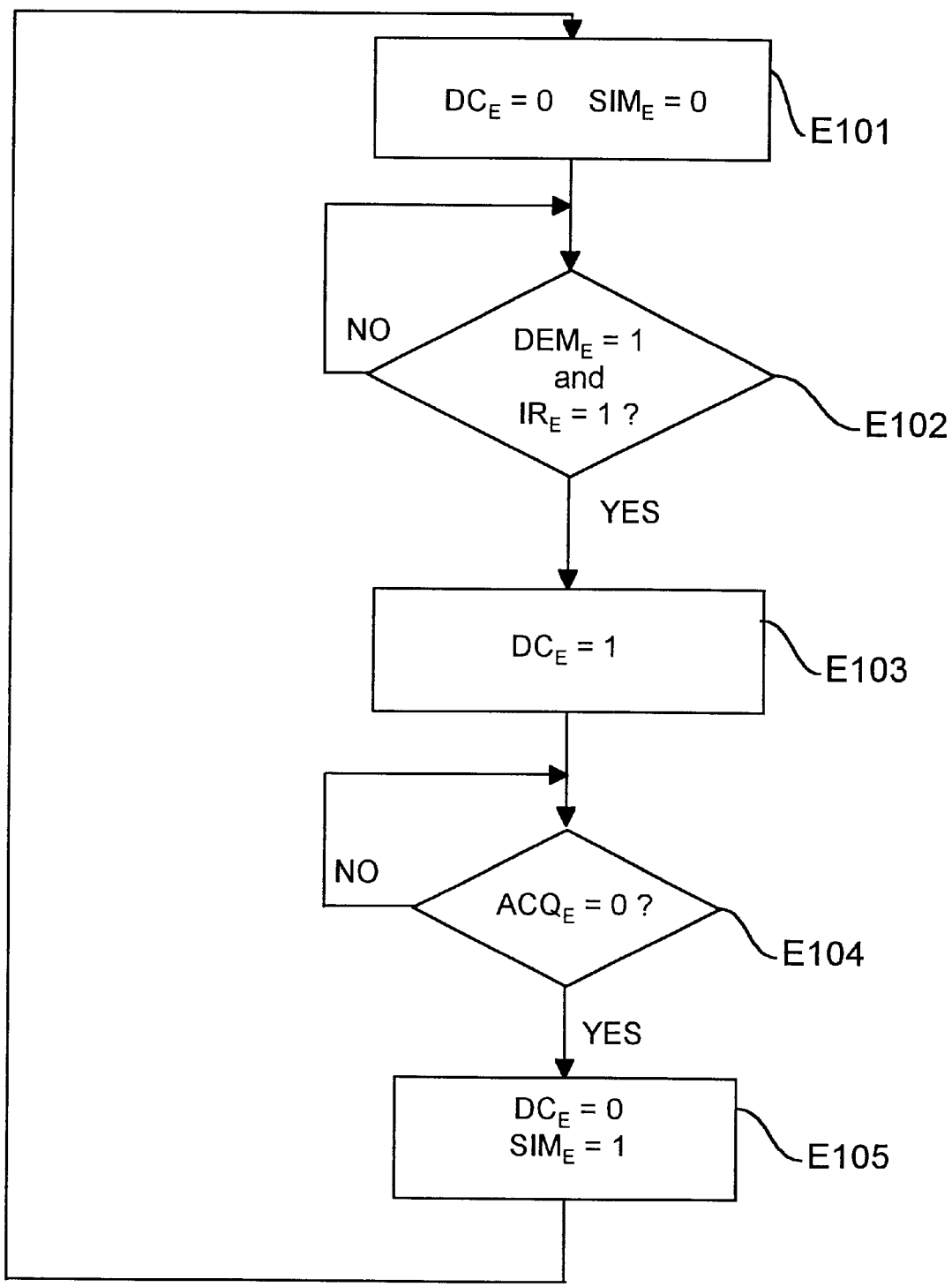

FIG. 11 depicts an algorithm for the transfer of data between the main memory 11 and the buffer memory 13, via the direct access circuit 12. This algorithm includes steps E101 to E105 and is implemented by the automatic control device. Steps E01 to E105 are run through cyclically, and the automatic control device 19 goes from one step to the following at each switching of an internal clock.

Step E101 is the initiation of the data transfer, at which the signal $DC_E$ requesting a direct access channel is at the low state, that is to say the automatic control device 19 is not requesting a direct access channel to the direct access circuit 12. The signal $SIM_E$ is also at the low state, which means that no octet is presented at the input of the buffer memory 13 by the direct access circuit 12.

The following step E102 is a logic test on the values of the signals $DEM_E$ and $IR_E$ in order to verify that they are both at the high state. The signal $DEM_E$ at the high state indicates that the circuit 15 is enabling a sending of data, and the signal $IR_E$ at the high state indicates that the buffer memory 13 is not full and can receive data. As long as these signals are not both at the high state, step E102 is reiterated.

When the signals $DEM_E$ and $IR_E$ both go to the high state, the automatic control device 19 transmits the signal $DC_E$ at the high state to the direct access circuit 12, at step E103, in order to request a direct access channel.

The following step E104 is a test of the logic value of the signal $ACQ_E$ in order to determine whether the direct access circuit 12 is in the process of effecting the requested transfer. As long as the signal $ACQ_E$ is at the high state, step E104 is looped back on itself; when the signal $ACQ_E$ goes to the low state, this means that the direct access circuit 12 effects the transfer of data between the main memory 11 and the buffer memory 13. In the latter case, step E104 is followed by step E105.

At step E105, the automatic control device cancels its request for a direct access channel by transmitting the signal $DC_E$ at the low state to the direct access circuit 12. The automatic control device 19 transmits the signal $SIM_E$ at the high state to the buffer memory 3 in order to indicate to it that the data are being presented to it at its input. Consquently the data transmitted by the direct access circuit are stored in the buffer memory 13.

Step E105 is followed by step E101, previously described.

FIG. 12 depicts an algorithm for the transfer of data between the buffer memory 13 and the error correction circuit 14. This algorithm includes steps E110 to E116, which are run through cyclically. The automatic control device 19 goes from one step to the next at each switching of an internal clock, which can be different from that used for the algorithm in FIG. 11.

The algorithm for the transfer of data between the buffer memory 13 and the error correction circuit 14 successively controls a transfer of the first predetermined number N of useful data words, and an interruption of the transfer of the data words for a period of interruption corresponding to the period which will be necessary for transferring the second predetermined number K of additional words.

The purpose of the initialisation step E110 is:
to set to zero a counter $CPT_E$ which counts the octets transmitted between the buffer memory 13 and the error correction circuit 14,
to transmit the signal $SOM_E$ at the low state to the buffer memory 13 in order to signify an absence of an instruction to transmit an octet from the buffer memory 13 to the circuit 14,
to transmit the signals $SIF_E$ and $ST_E$ at the low state to the correction circuit 14, in order to signify that no octet is presented at the input of the circuit 14.

The following step E111 is a logic test of the signals $DEM_E$ and $OR_E$. When these signals are both at the high state, this means that a sending request has been transmitted to the automatic control device 19, and that the buffer memory 13 contains data to be transmitted. As long as these two conditions are not verified, step E111 is reiterated.

When these two conditions are verified, step E111 is then followed by step E112, during which the counter $CPT_E$ is incremented by one unit, and the automatic control device 19 transmits the signal $SOM_E$ at the high state to the buffer memory 13 in order to indicate to it an instruction to transmit an octet from the buffer memory 13 to the circuit 14, and transmits the signals $SIF_E$ and $ST_E$ at the high state to the error correction circuit 14, in order to signify that an octet is presented at the input of the circuit 14, and that this octet constitutes the start of a useful data block.

At the following step E113, the counter $CPT_E$ is incremented by one unit and the automatic control device 19 transmits the signal $SOM_E$ at the high state to the buffer memory 13 in order to indicate to it an instruction to transmit an octet from the buffer memory 13 to the circuit 14, and transmits the signal $SIF_E$ at the high state and the signal $ST_E$ at the low state to the error correction circuit 14, in order to indicate that an octet is presented at the input of the circuit 14, and that this octet does not constitute the start of a useful data block.

The following step E114 is a test for verifying whether the counter $CPT_E$ of octets transmitted to the error correction circuit 14 has reached the predetermined value N, corresponding to the number of useful octets present in an error correction code word. As long as the value N is not reached, step E113 is repeated.

Steps E112 and E113 allow the transfer of useful octets $OC_1$ to $OC_N$ between the memory 13 and the error correction circuit 14.

When N useful octets have been transmitted to the error correction circuit 14, step E114 is followed by step E115, at which the counter $CPT_E$ is incremented by one unit, and the automatic control device 19 transmits the signal $SOM_E$ at the low state to the buffer memory 13 in order to indicate to it an absence of an instruction to transmit an octet from the buffer memory 13 to the circuit 14, and transmits the signal $SIF_E$ at the high state and the signal $ST_E$ at the low state to the error correction circuit 14, in order to indicate that an octet is presented at the input of the circuit 14, and that this octet does not constitute the start of a useful data block.

The octets transmitted to the circuit 14 during step E115 are not useful octets, and their value has no importance. These octets are padding octets $Or_1$, to $Or_K$, which will be replaced subsequently by the redundant octets $OR_1$, to $OR_K$ determined by the error correction circuit 14.

The following step E116 is a test for verifying the value of the counter $CPT_E$. As long as the counter $CPT_E$ has not reached the value N+K, step E115 is repeated.

When the counter $CPT_E$ has reached the value N+K, a sufficient number of octets have been transmitted to enable the error correction circuit 14 to form an error correction code word MC. Step E116 is then followed by step E110. Steps E110 to E116 are repeated as long as there remain any octets in the buffer memory 13 to be transmitted to the error correction circuit 14 (signal $OR_E$ at the high state).

FIG. 13 depicts an algorithm for the transfer of data between the error correction circuit 14 and the sending circuit 15. This algorithm includes steps E120 to E123, which are run through cyclically by the automatic control device. The automatic control device 19 goes from one step to the following at each switching of an internal clock, which can be different from those used for the algorithms of FIGS. 11 and 12.

Step E120 is an initialisation at which the control circuit 19 sets the signal $SOF_E$ to the low state, in order to indicate to the error correction circuit 14 not to transmit data to the sending circuit 15.

The following step E121 is a test for verifying the value of the signals $DEM_E$ and $OUT_E$. As long as the signals $DEM_E$ and $OUT_E$ are not both at the high state, step E121 is repeated.

When the signals $DEM_E$ and $OUT_E$ are both at the high state, this means that a request to send data has been transmitted to the control circuit 19, and that the error correction circuit 14 contains data to be transmitted. Step E121 is then followed by step E122, at which the automatic control device 19 transmits the signal $SOF_E$ at the high state to the error correction circuit 4 in order to indicate to it to transmit an octet to the sending circuit 15.

The following step E123 is a test for verifying the value of the signals $DEM_E$ and $OUT_E$. As long as the signals $DEM_E$ and $OUT_E$ are not both at the low state, step E122 is repeated in order to transmit an octet to the sending circuit 15.

When the signals $DEM_E$ and $OUT_E$ are both at the low state, this means that there is no longer any request to send data which is transmitted to the control circuit 19, and that the error correction circuit 14 does not contain any data to be transmitted. Step E123 is then followed by the initialisation step E120.

The reception of data will now be dealt with, described with reference to FIGS. 10, 14, 15 and 16. The reception of data entails data transfers between the reception circuit 18, the error correction circuit 17, the memory 16, the direct access circuit 12 and the main memory 11. These transfers are controlled by the automatic control device 19 and are described in the form of algorithms.

The data transfers described with reference to FIGS. 14, 15 and 16 can be performed simultaneously, whilst being asynchronous.

FIG. 14 depicts the algorithm for the transfer of data between the data reception circuit 18 and the error correction circuit 17. This data transfer entails exchanges of logic signals between the automatic control device 19 and the error correction circuit 17. The algorithm includes steps E130 to E135, which are run through cyclically by the automatic control device. The algorithm goes from one step to the following at each switching of an internal clock.

Step E130 is an initialisation, the purpose of which is:
- to set to zero a counter $CPT_R$, which counts the octets which enter the error correction circuit 17,
- to transmit the signal $SIF_R$ at the low state to the error correction circuit 17, in order to indicate that no octet is presented at the input of the error correction circuit 17,
- to transmit the signal $ST_R$ at the low state to the error correction circuit 17, in order to indicate that the first octet of a block is not being transmitted to the error correction circuit 17.

The following step E131 is a test for verifying the value of the signal $DEM_R$. As long as the signal $DEM_R$ remains at the low state, no reception of data is detected and step E131 is then repeated.

When the signal $DEM_R$ goes to the high state, a reception of data is detected, and step E131 is followed by step E132.

At step E132, the counter $CPT_R$ is incremented by one unit, and the automatic control device 19 transmits the signals $SIF_R$ and $ST_R$ at the high state to the error correction circuit 17, in order to indicate to it that the reception circuit is transmitting an octet to it, and that this octet is the start of a useful data block.

At the following step E133, the counter $CPT_R$ is incremented by one unit, and the automatic control device 19 transmits the signals $SIF_R$ and $ST_R$ at the high and low states respectively, to the error correction circuit 17, in order to indicate to it that the reception circuit is transmitting an octet to it, and that this octet is not the start of a useful data block.

Step E133 is followed by step E134, which is a test for verifying whether the counter $CPT_R$ has reached the value N+K. As long as this value is not reached, step E133 is repeated, so as to transmit an error correction code word MC to the error correction circuit 17.

When the counter $CPT_R$ reaches the value N+K, step E134 is followed by step E135, at which the value of the signal $DEM_R$ is tested. If the signal $DEM_R$ is at the high state, this means that there are still data being received by the reception circuit 18, and step E135 is followed by step E132 in order to process another error correction code word.

If the signal $DEM_R$ is at the low state, this means that there are no more data being received by the reception circuit 18, and step E135 is followed by step E130.

FIG. 15 depicts an algorithm for the transfer of data between the error correction circuit 17 and the buffer memory 16. This algorithm includes steps E140 to E145, which are run through cyclically. The algorithm goes from one step to the following at each switching of the internal clock, which can be different from that used for the algorithm of FIG. 14.

The algorithm for the transfer of data between the error correction circuit 17 and the buffer memory 16 controls successively a transfer of the first predetermined number N of useful data words, and an interruption of the transfer of the data words for a period of interruption corresponding to the period which would be necessary for transferring the second predetermined number K of additional words.

Step E140 is an initialisation whose purpose is:
- to set to zero a counter $CP2_R$, which counts the octets transmitted from the error correction circuit 17 to the buffer memory 16,
- to transmit the signal $SIM_R$ at the low state to the buffer memory 16, in order to indicate to it that no octet is being supplied to it as an input,
- to transmit the signal $SOF_R$ at the low state to the error correction circuit 17 in order to indicate to it not to transmit any octet to the buffer memory 16.

The following step E141 is a test of the value of the signals $OUT_R$, $DEM_R$ and $IR_R$.

As long as the signals $OUT_R$, $DEM_R$ and $IR_R$ are not all three at the high state, step E141 is repeated.

When these three signals are at the high state, this means respectively that:
- useful octets are present at the output of the error correction circuit 17 to the buffer memory 16,
- a data reception is detected,
- the buffer memory 16 is not full and can consequently receive data.

When these three conditions are verified, step E141 is followed by step E142, at which the counter $CP2_R$ is incremented by one unit, the automatic control device 19 transmits the signal $SIM_R$ at the high state to the buffer memory 16, in order to indicate to it that an octet is being presented to it as an input, and the automatic control device 19 transmits the signal $SOF_R$ at the high state to the error correction circuit 17 in order to control the transmission of an octet between the error correction circuit 17 and the buffer memory 16.

The following step E143 is a test for verifying whether the counter $CP2_R$ has reached the value N. As long as this is not the case, step E142 is repeated.

When the counter $CP2_R$ has reached the value N, this means that the error correction circuit has transmitted the N useful octets $OC_1$ to $OC_N$ of an error correction code word MC to the buffer memory 16. Step E143 is then followed by step E144, at which the counter $CP2_R$ is incremented by one unit, the automatic control device 19 transmits the signal SIM$_R$ at the low state to the buffer memory 16 in order to instruct it not to receive an octet, and the automatic control device 19 transmits the signal SOF$_R$ at the high state to the error correction circuit 17 in order to control the transmission of an octet between the error correction circuit 17 and the buffer memory 16.

At step E144, the redundant octets OR$_1$, to OR$_K$ of the error correction code word MC which leave the circuit 17 are not stored in the buffer memory 16.

The following step E145 is a test on the value of the counter CP2$_R$, in order to repeat step E144 for the K redundant octets of the error correction code word. Thus, as long as the counter CP2$_R$ has not reached the value N+K, step E144 is repeated, and when this value is reached step E145 is followed by step E140.

FIG. 16 depicts an algorithm for the transfer of data between the buffer memory 16 and the main memory 11, via the direct access circuit 12. The algorithm includes steps E150 to E154, which are run through cyclically by the automatic control device. The algorithm goes from one step to the following at each switching of an internal clock, which can be different from those used for the algorithms of FIGS. 14 and 15.

Step E150 is an initialisation at which:
the signal DC$_R$ is transmitted at the low state to the direct access circuit 12 in order to indicate to it that there are no data to be transferred from the buffer memory 16 to the main memory 11, and
the signal SOM$_R$ is transmitted at the low state to the buffer memory 16 in order to instruct it not to transmit an octet to the direct access circuit 12.

The following step E151 is a test on the value of the signals DEM$_R$ and OR$_R$. As long as the signals DEM$_R$ and OR$_R$ are not both at the high state, step E151 is repeated.

When the signals DEM$_R$ and OR$_R$ are both at the high state, this means that a data reception is detected and that the buffer memory 16 contains data to be transmitted to the main memory 11. Step E151 is then followed by step E152, at which the automatic control device 19 transmits the signal DC$_R$ at the high state to the direct access circuit in order to demand from it a direct access channel to the main memory 11.

The following step E153 is a test on the value of the signal ACQ$_R$, in order to determine whether the direct access circuit is executing the transfer of data between the buffer memory 16 and the main memory 11. As long as the response is negative, that is to say the signal ACQ$_R$ is at the high state, step E153 is repeated.

When the signal ACQ$_R$ goes to the low state, step E153 is followed by step E154, at which the signal SOM$_R$ is transmitted at the high state to the buffer memory 16, in order to instruct it to transmit the octets to the direct access circuit 12.

When the data have been transferred from the buffer memory 16 to the main memory 11, step E154 is followed by step E150.

Naturally the present invention is in no way limited to the embodiments described and depicted, but quite the contrary encompasses any variant within the capability of persons skilled in the art.

What is claimed is:

1. Device for encoding useful data extracted from a main memory, the device comprising:
   a buffer memory, arranged for storing the useful data extracted from the main memory;
   an encoder, arranged for encoding the useful data when transferred from the buffer memory in order to generate encoded data including the useful data and additional data; and
   a controller, arranged for controlling a transfer of the useful data between the buffer memory and the encoder, and being adapted to interrupt the transfer of further useful data for a time period sufficient for transferring padding data from the buffer memory to the encoder.

2. Device according to claim 1, wherein the controller also is adapted to control a transfer of the useful data between the main memory and the buffer memory.

3. Device according to claim 1, wherein the controller also is adapted to control a transfer of the encoded data between the encoder and a transmitter.

4. Device according to claim 1, wherein the device is a communication device.

5. Device according to claim 1, wherein the device is a printer.

6. Device according to claim 1, wherein the device is a facsimile apparatus.

7. Device for decoding encoded data including useful data and additional data, the device comprising:
   a decoder, arranged for decoding the encoded data in order to output the useful data;
   a buffer memory, arranged for storing the useful data when transferred from the decoder in order to store the useful data in a main memory; and
   a controller, arranged for controlling a transfer of the useful data between the decoder and the buffer memory, and being adapted to interrupt the transfer of the useful data for a time period sufficient for transferring the additional data after the useful data is transferred.

8. Device according to claim 7, wherein the controller also is adapted to control a transfer of the useful data between the buffer memory and the main memory.

9. Device according to claim 7, wherein the controller also is adapted to control a transfer of the encoded data between a receiver and the decoder.

10. Device according to claim 7, wherein the device is a communication device.

11. Device according to claim 7, wherein the device is a printer.

12. Device according to claim 7, wherein the device is a facsimile apparatus.

13. Method of encoding useful data extracted from a main memory, the method comprising the steps of:
   storing the useful data extracted from the main memory in a buffer memory;
   encoding the useful data when transferred from the buffer memory using an encoder in order to generate encoded data including the useful data and additional data; and
   controlling a transfer of the useful data between the buffer memory and the encoder, and interrupting the transfer of further useful data for a time period sufficient for transferring padding data from the buffer memory to the encoder.

14. Method according to claim 13, further comprising the step of controlling a transfer of the encoded data between the encoder and a transmitter.

15. Method according to claim 13, further comprising the step of controlling a transfer of the useful data between the main memory and the buffer memory.

16. Method according to claim 13, wherein said method is applicable to a communication device, a printer or a facsimile apparatus.

17. Method of decoding encoded data including useful data and additional data, the method comprising the steps of:
   decoding the encoded data using a decoder in order to output the useful data;

storing the useful data when transferred from the decoder in a buffer memory in order to store the useful data in a main memory; and controlling a transfer of the useful data between the decoder and the buffer memory, and interrupting the transfer of the useful data for a time period sufficient for transferring the additional data after the useful data is transferred.

18. Method according to claim 17, further comprising the step of controlling a transfer of the useful data between the buffer memory and the main memory.

19. Method according to claim 17, further comprising the step of controlling a transfer of the encoded data between a receiver and the decoder.

20. Method according to claim 17, wherein said method is applicable to a communication device, a printer or a facsimile apparatus.

21. Storage medium storing a program for performing a method of encoding useful data extracted from a main memory, the method comprising the steps of:

storing the useful data extracted from the main memory in a buffer memory;

encoding the useful data when transferred from the buffer memory using an encoder in order to generate encoded data including the useful data and additional data; and controlling a transfer of the useful data between the buffer memory and the encoder, and interrupting the transfer of further useful data for a time period sufficient for transferring padding data from the buffer memory to the encoder.

22. Storage medium according, to claim 21, wherein the method further comprises the step of controlling a transfer of the useful data between the main memory and the buffer memory.

23. Storage medium according to claim 21, wherein the method further comprises the step of controlling a transfer of the encoded data between the encoder and a transmitter.

24. Storage medium according to claim 21, wherein said program is applicable to a communication device, a printer or a facsimile apparatus.

25. Storage medium storing a program for performing a method of decoding encoded data including useful data and additional data, the method comprising the steps of:

decoding the encoded data using a decoder in order to output the useful data;

storing the useful data when transferred from the decoder in a buffer memory in order to store the useful data in a main memory; and controlling a transfer of the useful data between the decoder and the buffer memory, and interrupting the transfer of the useful data for a time period sufficient for transferring the additional data after the useful data is transferred.

26. Storage medium according to claim 25, wherein the method further comprises the step of controlling a transfer of the useful data between the buffer memory and the main memory.

27. Storage medium according to claim 25, wherein the method further comprises the step of controlling a transfer of the encoded data between a receiver and the decoder.

28. Storage medium according to claim 25, wherein said program is applicable to a communication device, a printer or a facsimile apparatus.

* * * * *

UNITED STATES PATENT AND TRADEMARK OFFICE
CERTIFICATE OF CORRECTION

PATENT NO.     : 6,477,677 B1
DATED          : November 5, 2002
INVENTOR(S)    : Anne Abiven et al.

It is certified that error appears in the above-identified patent and that said Letters Patent is hereby corrected as shown below:

Column 7,
Line 48, "$OC_1$," should read -- $OC_1$ --; and
Line 50, "$OR_1$," should read -- $OR_1$ --.

Column 8,
Line 21, "bus $B_1$," should read -- bus $B_1$ --.

Column 14,
Line 21, "$OR_1$," should read -- $OR_1$ --;
Line 37, "$OR_1$," should read -- $OR_1$ --; and
Line 61, "$OR_1$," should read -- $OR_1$ --.

Column 16,
Line 62, "Steps E01" should read -- Steps E101 --.

Column 17,
Line 30, "squently" should read -- sequently --.

Column 18,
Line 39, "octets $OR_1$," should read -- octets $OR_1$ --; and
Line 40, "octets $OR_1$," should read -- octets $OR_1$ --.

Column 21,
Line 6, "octets $OR_1$," should read -- octets $OR_1$ --.

Signed and Sealed this

Eighth Day of July, 2003

JAMES E. ROGAN
*Director of the United States Patent and Trademark Office*